United States Patent
Kodialam et al.

(10) Patent No.: US 7,660,315 B2
(45) Date of Patent: Feb. 9, 2010

(54) CHARACTERIZING ACHIEVABLE FLOW RATES IN MULTI-HOP MESH NETWORKS WITH ORTHOGONAL CHANNELS

(75) Inventors: Muralidharan S. Kodialam, Marlboro, NJ (US); Thyagarajan Nandagopal, Middletown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 633 days.

(21) Appl. No.: 11/194,748

(22) Filed: Aug. 1, 2005

(65) Prior Publication Data

US 2007/0025364 A1 Feb. 1, 2007

(51) Int. Cl.
*H04L 12/28* (2006.01)
*H04L 12/56* (2006.01)
(52) U.S. Cl. .................. 370/400; 370/254; 370/503
(58) Field of Classification Search .......... 370/254, 370/400, 503; 455/562
See application file for complete search history.

(56) References Cited

U.S. PATENT DOCUMENTS

| | | | |
|---|---|---|---|
| 7,184,413 B2 * | 2/2007 | Beyer et al. | 370/254 |
| 7,286,489 B2 * | 10/2007 | Ades | 370/254 |
| 2003/0087674 A1 * | 5/2003 | Li et al. | 455/562 |
| 2005/0039132 A1 * | 2/2005 | Germain et al. | 715/736 |
| 2006/0215583 A1 * | 9/2006 | Castagnoli | 370/254 |

OTHER PUBLICATIONS

Rhee et al "Distributed Scalable TDMA Scheduling Algorithm" Apr. 26, 2004.*

Zhu et al. "A Five-Phase Reservation Protocol (FPRP) for Mobile Ad Hoc Networks" Mar. 29, 1998.*

"Characterizing Achievable Rates in Multi-hop Wireless Mesh Networks with Orthogonal Channels," by Muralidharan S. Kodialam and Thyaga Nandagopal, IEEE/ACM Transactions on Networking, Aug. 2005, vol. 13, Issue 4, pp. 868-880.

"Characterizing Achievable Rates in Multi-hop Wireless Networks: The Joint Routing and Scheduling Problem," by Muralidharan S. Kodialam and Thyaga Nandagopal, International Conference on Mobile Computing and Networking Proceedings of the 9$^{th}$ Annual International Conference on Mobile Computing And Networking, Sep. 14-19, 2003, San Diego, CA, USA, ISBN: 1-58113-753-2, pp. 42-54.

* cited by examiner

*Primary Examiner*—Dang T Ton
*Assistant Examiner*—Robert M Morlan
(74) *Attorney, Agent, or Firm*—Mendelsohn, Drucker & Associates, P.C.

(57) ABSTRACT

A method of routing data in a multi-hop network. In one embodiment, the method includes: determining that a link-flow vector representing a set of flows to be routed from a source to a destination node satisfies necessary scheduling conditions for achievability; generating a scheduling multi-graph having at least one pair of nodes with multiple edges therebetween; deriving one or more sufficient scheduling conditions for achievability of the vector; solving a linear optimization problem over the necessary scheduling conditions to obtain an upper bound on achievability of the vector; and generating, based on the scheduling multi-graph, a routing solution that is a lower bound on the achievability of the vector and has a set of routes and associated schedule for achieving the vector. At least one node v receives transmissions from a specified plurality $\Omega(v)$ of other nodes. At least one of the scheduling conditions depends on $\Omega(v)$.

39 Claims, 6 Drawing Sheets

Exemplary Mesh Network

Exemplary Mesh Network

Exemplary 3-Node Network

DETERMINE_FEASIBILITY $\eta(v) = \delta \quad \forall v \in V$ and $c = 0$

While $\sum_{v \in V} \eta(v) < 1$

For $k = 1, 2, \ldots, K$ $r = r(k)$

While $r > 0$ $$\text{Set } l(e) = \frac{1}{c(e)} \left[ \eta(t(e)) + \frac{\eta(r(e))}{\Omega(r(e))} \right]$$

Compute shortest path length from $s(k)$ to $t(k)$

Let $P^* = \arg\min_{P \in P_k} \eta(P)$ be the optimal path.

Let $u = \min_{v \in P^*} f(v, P^*)$.

$\delta = \min\{r, u\}; \quad r \leftarrow r - \delta$ $f(e) \leftarrow f(e) + \delta, \forall e \in P^*$ $\eta(v) \leftarrow \eta(v)(1 + \theta(v, P^*)\delta), \quad \forall v \in P^*$ end While end For

$c \leftarrow c + 1$ end While

Compute $\rho = \max_{v \in V} \sum_{e \in N(v)} \frac{f(e)}{c(e)}$

Output $\lambda^* = \frac{c}{\rho}$

FIG. 3

Table 1: Full Duplex System: Effect of $\Omega(v)$

| No. of flows | $\Omega = 1$ | | $\Omega = 2$ | | $\Omega = 3$ | |
|---|---|---|---|---|---|---|
| | UB | SF | UB | SF | UB | SF |
| 1 | 10 | 99.6 | 10 | 99.6 | 10 | 99.6 |
| 5 | 5 | 100 | 10 | 98.1 | 10 | 98.1 |
| 10 | 3.333 | 99.8 | 6.724 | 97.3 | 6.732 | 97.1 |
| 15 | 2.5 | 99.8 | 4 | 99.4 | 4 | 99.5 |
| 20 | 2.0 | 99.8 | 3.3411 | 99.2 | 3.3458 | 99.2 |
| 25 | 1.4389 | 99.8 | 2.864 | 99.3 | 2.8662 | 98.8 |
| 30 | 1.2502 | 99.8 | 2.2358 | 99.2 | 2.2243 | 99.5 |
| 35 | 1.1112 | 99.8 | 1.8266 | 99.2 | 1.8288 | 99.2 |

Table 2: Half Duplex System: Effect of $\Omega(v)$

| No. of flows | $\Omega = 1$ | | $\Omega = 2$ | | $\Omega = 3$ | |
|---|---|---|---|---|---|---|
| | UB | SF | UB | SF | UB | SF |
| 1 | 10 | 99.6 | 10 | 99.6 | 10 | 99.6 |
| 5 | 5 | 99.8 | 6.667 | 99 | 7.5 | 84.2 |
| 10 | 3.334 | 93.1 | 4.484 | 84.3 | 5.034 | 75.8 |
| 15 | 2.233 | 96.4 | 2.874 | 82.2 | 3.177 | 73.4 |
| 20 | 1.829 | 90.5 | 2.359 | 90.6 | 2.622 | 81.4 |
| 25 | 1.44 | 98.8 | 1.918 | 90.9 | 2.164 | 83.2 |
| 30 | 1.184 | 93.7 | 1.5445 | 90.4 | 1.723 | 82.1 |
| 35 | 1.008 | 92 | 1.304 | 85.1 | 1.442 | 77 |

Exemplary 15-Node Mesh Network

CHARACTERIZING ACHIEVABLE FLOW RATES IN MULTI-HOP MESH NETWORKS WITH ORTHOGONAL CHANNELS

BACKGROUND OF THE INVENTION

1. Field of the Invention

The present invention relates to routing in multi-hop (e.g., wireless) mesh networks, and, more particularly, to the routing of flows and scheduling of transmissions to achieve a given rate vector.

2. Description of the Related Art

Wireless multi-hop networks have attracted a lot of attention in recent years as the next evolutionary step for wireless data networks. In multi-hop networks, communication between two end nodes is carried out through a number of intermediate nodes whose function is to relay information from one point to another. In a typical wireless multi-hop mesh network, small nodes that act as simple routers are installed throughout a site (e.g., a home, business, or office) by simply plugging them into power outlets. Each node then transmits a low-power signal capable of reaching neighboring nodes, which in turn transmit to successive nodes, with the process being repeated until the data arrives at its destination.

Multi-hop networks have evolved into two distinct classes: fixed-mesh networks and mobile ad-hoc networks. In a fixed-mesh network, nodes are fixed in place and are typically endowed with more power resources than nodes in a mobile ad-hoc network. However, in both these network classes, wireless nodes possess limited communication capabilities. One of these limitations is the number of neighbors that these nodes can communicate with simultaneously. This is primarily determined by the channel model: either a single shared channel or a set of orthogonal communication channels. From a medium-access protocol perspective, in a shared-channel model, interference from ongoing neighboring transmissions on the same channel can prevent successful transmissions between two nodes. In the model employing a set of orthogonal communication channels, neighboring transmissions are possible using different (orthogonal) channels.

A problem that arises in wireless multi-hop networks that use orthogonal channels for communication between nodes is characterizing the rates that are achievable. One solution to this problem is to use polynomial-time approximation algorithms to route flows and schedule transmissions in a scenario in which each node is allowed to be in communication with at most one other node at any time instant. However, this solution does not address the scenario in which a node is allowed to engage in multiple simultaneous communications with its neighbors, which introduces various system-design and physical-layer constraints. This multiple simultaneous communication scenario is ever more common due to the availability of multiple orthogonal channels in existing and proposed wireless standards and the use of multiple receivers (radios) within a single wireless device.

SUMMARY OF THE INVENTION

The present invention, in one embodiment, addresses the problem of determining achievable rates, i.e., how to (i) route flows and (ii) schedule transmissions to achieve a given rate vector, in both half-duplex and full-duplex wireless multi-hop mesh networks with orthogonal channels. The routing problem is solved using efficient and relatively simple-to-implement Fully Polynomial-Time Approximation Schemes (FPTAS), and the scheduling problem is a solved as a graph-edge coloring problem. This approach is flexible and can be extended to handle sophisticated interference conditions and routing with diversity requirements.

In one embodiment, the present invention provides a method of routing data from a source node to a destination node in a multi-hop network of nodes interconnected by links. The method comprises: (a) determining that a link-flow vector satisfies one or more necessary scheduling conditions for achievability, wherein the link-flow vector represents a set of flows to be routed on one or more links from the source node to the destination node; (b) generating a scheduling multi-graph for the network, wherein the scheduling multi-graph comprises a graph having at least one pair of nodes with multiple edges therebetween; (c) deriving one or more sufficient scheduling conditions for achievability of the link-flow vector; (d) solving a linear optimization problem over the one or more necessary scheduling conditions to obtain an upper bound on the achievability of the link-flow vector; (e) generating, based on the scheduling multi-graph, a solution comprising a set of routes and an associated schedule for achieving the link-flow vector, the solution being a lower bound on the achievability of the link-flow vector; and (f) implementing a routing method using the set of routes and the associated schedule to route the link-flow vector from the source node to the destination node. At least one node v of the network is adapted to receive transmissions from a specified plurality $\Omega(v)$ of other nodes, and at least one of the scheduling conditions depends on $\Omega(v)$.

In another embodiment, the present invention provides a multi-hop network of nodes interconnected by links, wherein the network comprises an apparatus for routing data from a source node to a destination node. The apparatus is adapted to: (a) determine that a link-flow vector satisfies one or more necessary scheduling conditions for achievability, wherein the link-flow vector represents a set of flows to be routed on one or more links from the source node to the destination node; (b) generate a scheduling multi-graph for the network, wherein the scheduling multi-graph comprises a graph having at least one pair of nodes with multiple edges therebetween; (c) derive one or more sufficient scheduling conditions for achievability of the link-flow vector; (d) solve a linear optimization problem over the one or more necessary scheduling conditions to obtain an upper bound on the achievability of the link-flow vector; (e) generate, based on the scheduling multi-graph, a solution comprising a set of routes and an associated schedule for achieving the link-flow vector, the solution being a lower bound on the achievability of the link-flow vector; and (f) implement a routing method using the set of routes and the associated schedule to route the link-flow vector from the source node to the destination node. At least one node v of the network is adapted to receive transmissions from a specified plurality $\Omega(v)$ of other nodes, and at least one of the scheduling conditions depends on $\Omega(v)$.

In a further embodiment, the present invention provides an apparatus for routing data from a source node to a destination node in a multi-hop network of nodes interconnected by links. The apparatus is adapted to: (a) determine that a link-flow vector satisfies one or more necessary scheduling conditions for achievability, wherein the link-flow vector represents a set of flows to be routed on one or more links from the source node to the destination node; (b) generate a scheduling multi-graph for the network, wherein the scheduling multi-graph comprises a graph having at least one pair of nodes with multiple edges therebetween; (c) derive one or more sufficient scheduling conditions for achievability of the link-flow vector; (d) solve a linear optimization problem over the one or more necessary scheduling conditions to obtain an upper bound on the achievability of the link-flow vector; (e) generate, based on the scheduling multi-graph, a solution comprising a set of routes and an associated schedule for achieving the link-flow vector, the solution being a lower bound on the achievability of the link-flow vector; and (f) implement a routing method using the set of routes and the associated schedule to route the link-flow vector from the source node to the destination node. At least one node v of the network is adapted to receive transmissions from a specified plurality $\Omega(v)$ of other nodes, and at least one of the scheduling conditions depends on $\Omega(v)$.

In yet another embodiment, the present invention provides a method of routing data from a source node to a destination node in a multi-hop network of nodes interconnected by links. The method comprises (a) determining that a link-flow vector satisfies one or more necessary scheduling conditions for achievability, wherein the link-flow vector represents a set of flows to be routed on one or more links from the source node to the destination node; (b) generating a scheduling multi-graph for the network, wherein the scheduling multi-graph comprises a graph having at least one pair of nodes with multiple edges therebetween; (c) deriving one or more sufficient scheduling conditions for achievability of the link-flow vector; (d) solving a linear optimization problem over the one or more necessary scheduling conditions to obtain an upper bound on the achievability of the link-flow vector;(e) generating, based on the scheduling multi-graph, a solution comprising a set of routes and an associated schedule for achieving the link-flow vector, the solution being a lower bound on the achievability of the link-flow vector; and (f) implementing a routing method using the set of routes and the associated schedule to route the link-flow vector from the source node to the destination node. At least one node v of the network is adapted to transmit and receive in the same time slot, and at least one of the scheduling conditions depends on (i) a set of links $N_{in}(v)$ terminating at node v and (ii) a set of links $N_{out}(v)$ emanating from node v.

In yet a further embodiment, the present invention provides a multi-hop network of nodes interconnected by links, wherein the network comprises an apparatus for routing data from a source node to a destination node. The apparatus is adapted to: (a) determine that a link-flow vector satisfies one or more necessary scheduling conditions for achievability, wherein the link-flow vector represents a set of flows to be routed on one or more links from the source node to the destination node; (b) generate a scheduling multi-graph for the network, wherein the scheduling multi-graph comprises a graph having at least one pair of nodes with multiple edges therebetween; (c) derive one or more sufficient scheduling conditions for achievability of the link-flow vector; (d) solve a linear optimization problem over the one or more necessary scheduling conditions to obtain an upper bound on the achievability of the link-flow vector; (e) generate, based on the scheduling multi-graph, a solution comprising a set of routes and an associated schedule for achieving the link-flow vector, the solution being a lower bound on the achievability of the link-flow vector; and (f) implement a routing method using the set of routes and the associated schedule to route the link-flow vector from the source node to the destination node. At least one node v of the network is adapted to transmit and receive in the same time slot, and at least one of the scheduling conditions depends on (i) a set of links $N_{in}(v)$ terminating at node v and (ii) a set of links $N_{out}(v)$ emanating from node v.

In still a further embodiment, the present invention provides an apparatus for routing data from a source node to a destination node in a multi-hop network of nodes interconnected by links. The apparatus is adapted to: (a) determine that a link-flow vector satisfies one or more necessary scheduling conditions for achievability, wherein the link-flow vector represents a set of flows to be routed on one or more links from the source node to the destination node; (b) generate a scheduling multi-graph for the network, wherein the scheduling multi-graph comprises a graph having at least one pair of nodes with multiple edges therebetween; (c) derive one or more sufficient scheduling conditions for achievability of the link-flow vector; (d) solve a linear optimization problem over the one or more necessary scheduling conditions to obtain an upper bound on the achievability of the link-flow vector; (e) generate, based on the scheduling multi-graph, a solution comprising a set of routes and an associated schedule for achieving the link-flow vector, the solution being a lower bound on the achievability of the link-flow vector; and (f) implement a routing method using the set of routes and the associated schedule to route the link-flow vector from the source node to the destination node. At least one node v of the network is adapted to transmit and receive in the same time slot, and at least one of the scheduling conditions depends on (i) a set of links $N_{in}(v)$ terminating at node v and (ii) a set of links $N_{out}(v)$ emanating from node v.

BRIEF DESCRIPTION OF THE DRAWINGS

FIG. 3 shows pseudo-code for an exemplary primal-dual algorithm that may be employed in a half-duplex network to determine the feasibility of routing a given flow;

FIG. 7 shows tables illustrating system performance in a simulation of an algorithm consistent with the present invention for full-duplex and half-duplex systems;

DETAILED DESCRIPTION

Figure 1:
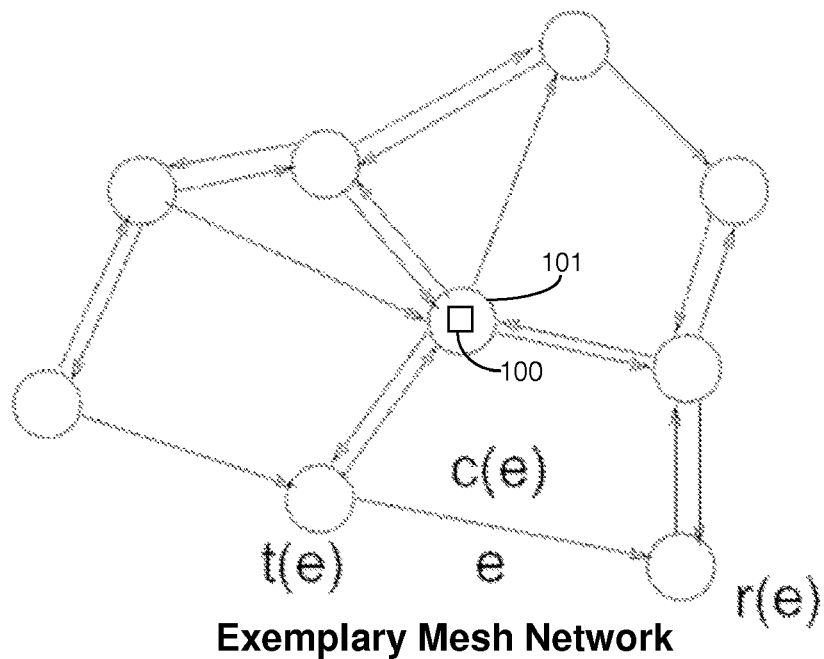
FIG. 1 shows an exemplary mesh network in one embodiment of the present invention.

A node that does not have a duplexer operates in half-duplex mode, i.e., the node can either transmit or receive in each time slot, but cannot both transmit and receive in the same time slot. A node that has a duplexer can operate in full-duplex mode, i.e., the node can transmit and receive in the same time slot. In the context of the present invention, a half-duplex network is one that has only half-duplex nodes, and a full-duplex network is one that has at least one full-duplex node.

Developments in Code-Division Multiple Access (CDMA) and Multiple-Input, Multiple-Output (MIMO) wireless systems have enabled wireless nodes to engage in simultaneous communication on multiple channels. While, theoretically, nodes can simultaneously transmit and receive using a full-duplex transceiver, as a practical matter, system design constraints might restrict nodes to half-duplex operation. In one embodiment of the present invention, the full-duplex and half-duplex cases are separately considered and the achievable rates analyzed in both cases. The framework of one embodiment of the present invention permits networks having a mix of full-duplex and half-duplex nodes to be characterized.

In a publication by Gupta, P., and Kumar, P. R., "The Capacity of Wireless Networks," *IEEE Transactions on Information Theory*, 46(2), pp. 388-400, 2000, incorporated herein in its entirety by reference, the authors show that the throughput per node n in a wireless multi-hop network with N nodes scales as $O(1/\sqrt{n})$ bit-meters/second. This asymptotic throughput bound holds under fairly general conditions for networks using a single shared channel.

However, one embodiment of the present invention considers networks with orthogonal channels and derives bounds on the actual performance for a given node configuration. While the asymptotic results in the Gupta and Kumar publication might apply to orthogonal channels, one embodiment of the present invention considers whether a given rate vector between multiple source-destination pairs is jointly achievable in a given wireless multi-hop network with specified node configurations, communication constraints, and wireless link speeds.

The problem addressed by the present invention, which is analogous to the multi-commodity flow problem addressed by Ahuja, Magnanti, and Orlin in *Network Flows: Theory, Algorithms, and Applications*, Prentice-Hall, 1993, Chapter 7, incorporated herein in its entirety by reference, jointly comprises a routing problem and a scheduling problem. In one embodiment of the present invention, the solution involves first characterizing achievable scheduling space and then solving the routing problem over the achievable scheduling space, as follows:

1. The achievable scheduling space is characterized under various communication models for wireless multi-hop networks with orthogonal channels.

2. The problem of determining whether or not a given set of source-destination rates is achievable is addressed. If such a set is achievable, then efficient, simple-to-implement algorithms are derived to compute end-to-end routes and per-link flows.

3. Efficient polynomial-time graph-edge coloring algorithms are provided for computing schedules for any given set of achievable source-destination rates.

The present invention, in certain embodiments, considers the problem of achieving a given rate vector in a wireless multi-hop network with orthogonal channels in networks with only primary interference, i.e., having the constraint that a node can transmit data to at most one other node and/or receive data from a limited number of neighbors at any time instant. This is applicable in practice due to the availability of multiple orthogonal channels in such networks that permit neighboring links to be allotted non-interfering channels. One embodiment of the present invention uses a linear programming formulation to characterize the schedulable space of such a network and solve the multi-commodity flow problem over this space. Finding the link schedules is reduced to a multi-graph edge-coloring problem, which is NP-complete. However, by using well-known efficient coloring algorithms, 67% of the optimal solution to compute efficient link schedules in $O(mn^4)$ time may be guaranteed, where N is the number of nodes n and M is the number of links m in the network. The present invention, in one embodiment, extends the previously-studied solution of achieving a given rate vector in a wireless multi-hop network with orthogonal channels by (1) generalizing the approach to full-duplex systems and deriving routing and scheduling algorithms for achieving a rate vector; and (2) considering the case in which a node has multiple receive-channel elements that enable it to receive transmissions from multiple neighbors simultaneously.

In one embodiment of the present invention, the link-flow achievability problem is solved by characterizing the necessary and sufficient conditions for the achievability of a link-flow vector, for both full-duplex and half-duplex systems. This approach naturally extends to the problem of determining the maximum data rate that can be sent between two nodes in the network. In the case of determining the maximum rate, the problem has a routing component and a scheduling component. The necessary conditions from the link-scheduling problem give rise to constraints on the routing problem that are employed for schedulability. This is a natural generalization of the maximum flow problem in capacitated networks. The present invention, in one embodiment, also considers the problem of determining if a given rate vector is achievable.

The present invention, in one embodiment, solves the routing component of the problem by formulating it as a linear programming problem with an exponential number of variables. Then, a primal-dual approach is used to develop an Fully Polynomial-Time Approximation Scheme (FPTAS) for obtaining an $\epsilon$-optimal solution to the problem. An $\epsilon$-optimal solution is one that has a value at least $(1-\epsilon)$ times the optimal solution, where $\epsilon$ represents the desired level of accuracy. An FPTAS scheme is a family of algorithms that finds an optimal solution in time that is a polynomial function of the problem parameters and $1/\epsilon$. The problem parameters, in the present scenario, are the number of nodes N in the network, the number of links M in the graph, and the number of source-destination pairs.

For ease of notation, the expression $O(f)$ is used herein to represent $f \log^{O(1)} m$, i.e., polylogarithmic terms are "hidden" in O.

Assumptions

In a hypothetical wireless multi-hop network with N nodes, the nodes communicate with each other via wireless links, and each node in the network can communicate directly with a subset of the other nodes in the network. If node u can transmit directly to node v, then this fact is represented by a directed edge (or "link") u→v from node u to node v. It is assumed that there are M links in the network. The nodes in the network and potential communication between nodes are represented by a directed network graph $G=(V,E)$, where V represents the set of nodes in the network, and E represents the set of directed edges or links in the network. Links are not assumed to be bi-directional. It is assumed that the system operates in a synchronous time-slotted mode. In the most general model, it can be assumed that a node can transmit to or receive communications from multiple nodes in any given time slot. In most multi-hop networks, the operating point of the system is typically in the linear portion of the power-rate curve. This implies that the achieved rate scales linearly with the power. Instead of allowing a node to transmit to multiple nodes in a given time slot by splitting the power at the node, it is possible to achieve the same mean rate by (a) allowing transmission to at most one node at peak power in any given time slot and (b) allocating slots proportional to desired link rates. Therefore, in any time slot, it is assumed that a node will transmit to only one user at peak power.

FIG. 1 illustrates an exemplary network in one embodiment of the present invention. Given a link $e \in E$, $t(e)$ is used to represent the transmitting node at one end of the link and $r(e)$ the receiving node at the other end of link e. A link e is said to be "active" when there is a transmission from $t(e)$ to $r(e)$. The variable $c(e)$ is used to represent the capacity of link e, e.g., it is assumed that link e can transmit data at $c(e)$ bits/second. Therefore, stationary channel conditions and transmission at maximum power at each node are implicitly assumed. It is assumed that a given node v can receive transmissions from at most $\Omega(v)$ nodes in any time slot, where $\Omega(v) \geq 1$, $\forall v \in V$, and is determined by the number of receive channel elements at the node.

The length of each time slot, e.g., in seconds, is represented by the variable $\tau$. Therefore, if a link is active for one time slot, then $\tau c(e)$ bits will be transmitted from $t(e)$ to $r(e)$ in one time slot. In the computation of the schedule for nodes, it is assumed that the schedule is periodic and has T time slots in each period, labeled $1, 2, \ldots, T$. If the system is asynchronous, then the results of the algorithms described herein will provide upper bounds on the performance of the system.

Given a node $v \in V$, $N_{in}(v)$ represents the set of incoming links that terminate at node v, i.e., $N_{in}(v) = \{e \in E : r(e) = v\}$. Similarly, for a given node $v \in V$, $N_{out}(v)$ represents the set of outgoing links that emanate from node v, i.e., $N_{out}(v) = \{e \in E : t(e) = v\}$. The variable $N(v)$ represents the set of links incident at node v, i.e., $N(v) = N_{in}(v) \cup N_{out}(v)$.

The exemplary network model considered herein corresponds to networks having multiple orthogonal channels available for transmission, with nodes having multiple channel elements for receiving simultaneously from multiple nodes. As stated earlier, it is assumed that, in any given time slot, a given node transmits to at most one other node in the network. An example of a system modeled by this mathematical abstraction is a frequency-division system where potentially colliding transmissions are assigned non-overlapping frequency bands. It is assumed that there is a higher layer that performs frequency planning to ensure that there is no interference. This model can also be used as an approximation for combined Time-Division Multiple Access (TDMA)/CDMA-based multi-hop networks where nearby transmissions are assigned orthogonal codes to disambiguate the transmissions from one another.

It is also assumed herein that all link speeds, flows, and rates are rational numbers. Before considering the maximum data rate that can be transmitted from a given source node to a given destination node, the simpler problem of the achievability of a given set of link flows is first considered.

Achieving Link Flows

The problem of determining if a set of link flows is achievable will now be addressed. Instead of attempting to solve this problem directly, simple necessary and sufficient conditions for the achievability of link flows are outlined. The objective is to derive a set of basic conditions that can be used to formulate and solve the end-to-end flow-requirement problems. Solving the link-scheduling problem also serves to illustrate the effect of scheduling on the routing problem.

Given an m-vector $\vec{f}$, where $f(e)$ is the desired flow on link $e \in E$, the objective is to determine necessary and sufficient conditions for this link-flow vector to be achievable. It is noted that the flow is specified as a link flow and not as an end-to-end flow. In order to achieve this link flow, a 0-1 scheduling variable $y_e^t$ is first defined, as follows:

$$y_e^t = \begin{cases} 1 & \text{if link } e \text{ is active in time slot } t \\ 0 & \text{otherwise} \end{cases}$$

Accordingly, the value 1 will be assigned to $y_e^t$ only if there is a transmission on link e in time period t.

Since no node can be transmitting to more than one node in a given time slot, the following Inequality (1) results:

$$\sum_{e \in N_{out}(v)} y_e^t \leq 1, \qquad (1)$$

$$\forall v \in V,$$

$$\forall t \leq T.$$

Similarly, since no node can receive from more than $\Omega(v)$ neighbors in a given time slot t, the following Inequality (2) results:

$$\frac{1}{\Omega(v)} \sum_{e \in N_{in}(v)} y_e^t \leq 1, \qquad (2)$$

$$\forall v \in V,$$

$$\forall t \leq T.$$

The fraction of a time link e is active is given by:

$$\frac{\sum_{t \leq T} y_e^t}{T}.$$

Therefore, the mean flow on link e is given by the following Equation (3):

$$f(e) = \frac{c(e) \sum_{t \leq T} y_e^t}{T}. \qquad (3)$$

The necessary conditions that a link-flow vector should satisfy in order to be schedulable will now be derived.

For a half-duplex system, two additional variables are introduced. The variable $I_x^t(v)$ represents an indicator function that takes the value of 1 if v is transmitting at time slot t and 0 otherwise, and the variable $I_r^t(v)$ represents an indicator function that takes the value of 1 if v is receiving at time slot t and 0 otherwise. Therefore, when a node v is half-duplex, communication constraints according to the following Inequalities (4-6) exist:

$$I_x^t(v) + I_r^t(v) \leq 1, \qquad (4)$$

$$\forall v \in V,$$

$$\forall t \leq T,$$

-continued $$\sum_{e \in N_{out}(v)} y_e^t \le I_x^t(v), \quad (5)$$

$\forall v \in V,$
$\forall t \le T,$
and $$\sum_{e \in N_{in}(v)} y_e^t \le \Omega(v) I_r^t(v), \quad (6)$$

$\forall v \in V,$
$\forall t \le T.$

The communication constraints of Equations (4-6) may be combined as given in the following Inequality (7):

$$\sum_{e \in N_{out}(v)} y_e^t + \frac{1}{\Omega(v)} \sum_{e \in N_{in}(v)} y_e^t \le 1, \quad (7)$$

$\forall v \in V,$
$\forall t \le T.$

Summing Inequality (7) over all T, interchanging the order of summation, and dividing by T, the necessary conditions for the achievability of a link-flow vector may be formally stated as given in the following Lemma 1:

Lemma 1: A given link-flow vector $\bar{f}$ is schedulable only if $$\sum_{e \in N_{out}(v)} \frac{f(e)}{c(e)} + \frac{1}{\Omega(v)} \sum_{e \in N_{in}(v)} \frac{f(e)}{c(e)} \le 1, \forall v \in V.$$

Figure 2:
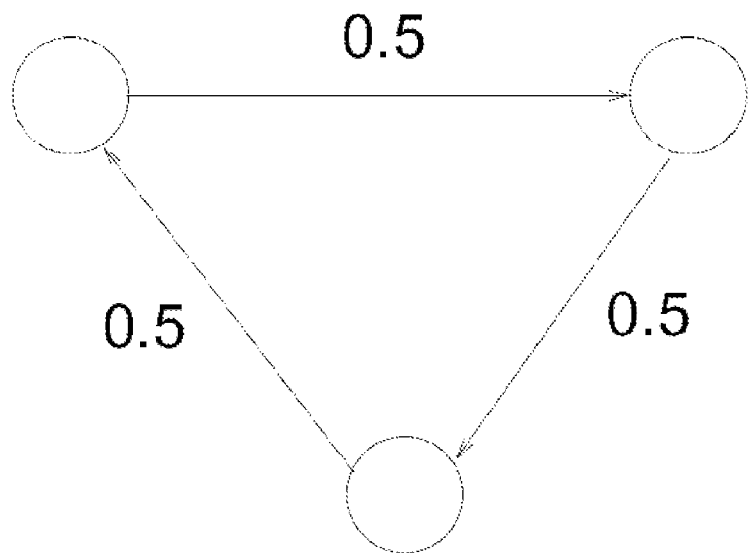
FIG. 2 shows an exemplary three-node network satisfying Lemma 1 of the present invention.

For the half-duplex system, the condition of Lemma 1 is a necessary condition (but not a sufficient condition). This is illustrated by the exemplary three-node network of FIG. 2, wherein $\Omega(v)=1, \forall v \in V$. The value of c(e) for each link is 1 unit, and the value of f(e) for each link is 0.5 units, as shown in FIG. 2. It should be noted that this flow vector satisfies Lemma 1 at all the nodes in the network. However, this flow vector is not achievable, because in any given time slot, at most one of the three links can be active. This gives a throughput of at most ⅓ on each link in the network. This gap between the necessary condition for achievability and actual achievability of the flow vector results from averaging the scheduling constraints over time, which relaxes the 0-1 constraints on the $y_e^t$ variables.

In the case of a full-duplex system, a given node v can transmit to at most one node in any given time slot. Therefore, summing Equation (1) over all t, the following Inequality (8) results:

$$\sum_{t \le T} \sum_{e \in N_{out}(v)} y_e^t \le T, \quad (8)$$

$\forall v \in V.$

Interchanging the order of summation, and dividing by T, the following Equation (9) results:

$$\sum_{e \in N_{out}(v)} \frac{f(e)}{c(e)} = \sum_{e \in N_{out}(v)} \frac{\sum_{t \le T} y_e^t}{T} \le 1, \quad (9)$$

$\forall v \in V.$

Similarly, since each node can receive from at most $\Omega(v)$ channels in any time slot, the following Equation (10) also holds true:

$$\sum_{e \in N_{in}(v)} \frac{f(e)}{c(e)} = \sum_{e \in N_{in}(v)} \frac{\sum_{t \le T} y_e^t}{T} \le \Omega(v), \forall v \in V. \quad (10)$$

Accordingly, the following Lemma 2 may be implied as the result:

Lemma 2: A given link-flow vector $\bar{f}$ is schedulable only if $$\sum_{e \in N_{out}(v)} \frac{f(e)}{c(e)} \le 1, \forall v \in V, \text{ and}$$

$$\frac{1}{\Omega(v)} \sum_{e \in N_{in}(v)} \frac{f(e)}{c(e)} \le 1, \forall v \in V.$$

Even though the 0-1 constraints are being averaged over time, the foregoing necessary conditions set forth in Lemmas 1 and 2 also happen to be sufficient conditions, as will now be explained.

The sufficient conditions for the achievability of a link-flow vector based on graph-edge coloring will now be derived.

A multi-graph is defined as a graph in which there may be multiple edges between the same pair of nodes. An alternative representation of a multi-graph is to have an integral weight w(e) on link e in network G, where w(e) represents the number of edges between t(e) and r(e) in the multi-graph.

A multi-graph on network G is now defined to aid in obtaining an achievable schedule for a given link-flow vector $\bar{f}$. With $\tau$ seconds/slot, at most $\tau$ c(e) bits/slot can be sent on link e. Hence, in order to achieve a link flow of f(e) bits/second, link e should be scheduled for f(e)/$\tau$c(e) slots/second. Therefore, a slot time $\tau$ is chosen such that the following Equation (11) is satisfied:

$$w(e) = \frac{f(e)}{c(e)} \frac{1}{\tau} \text{slots/second.} \quad (11)$$

Such a $\tau$ exists, since all values of f(e) and c(e) were assumed to be rational. There exist many $\tau$ that satisfy Equation (11). The largest such $\tau$ is chosen. The w(e) is the slot rate required to satisfy a flow of f(e) bits/second on a link e with a capacity c(e).

Given the network $G=(V,E)$, the flow vector $\bar{f}$, and link speed vector $\bar{c}$, the link weights $w(e)$ are defined as $$w(e) = \frac{f(e)}{\tau \cdot c(e)}, \forall e \in E(G).$$

The scheduling multi-graph $G_S(\bar{f},\tau)$ corresponding to G has the same node set V, with a link $e \in E(G)$ represented by edges in $G_S(\bar{f},\tau)$ between the same endpoints.

The "maximum degree" of the scheduling multi-graph is denoted by the following Equation (12):

$$\Delta = \max_{v \in V} \sum_{e \in N(v)} w(e). \quad (12)$$

The "maximum out-degree" of a node is denoted by the following Equation (13):

$$\Delta^+ = \max_{v \in V} \sum_{e \in N_{out}(v)} w(e). \quad (13)$$

The "maximum weighted-in degree" of a node is denoted by the following Equation (14):

$$\Delta_l^- = \max_{v \in V} \frac{1}{\Omega(v)} \sum_{e \in N_{in}(v)} w(e). \quad (14)$$

The subscript l is used in the notation for the maximum weighted-in degree in order to distinguish it from the maximum in-degree $\Delta^-$, which does not have the additional term $1/\Omega(v)$.

The sufficient conditions for the half-duplex and full-duplex models will now be derived.

For half-duplex systems, a suitable coloring is defined on the scheduling multi-graph $G_S(\bar{f},\tau)$ that will translate to a valid schedule in a half-duplex network graph, G.

A proper $\psi$-coloring of the scheduling multi-graph is defined such that the following three conditions apply for all nodes $v \in V$:

1. No two edges in the outgoing edge set $N_{out}(v)$ have the same color;
2. Any color i is present on at most $\Omega(v)$ incoming edges in $N_{in}(v)$; and
3. No color that appears on an edge in $N_{in}(v)$ appears on any edge in $N_{out}(v)$, i.e., the color list of the outgoing edges has nothing in common with the color list of the incoming edges.

The $\psi$-chromatic index $L_\psi$ (applicable to half-duplex networks) of the scheduling multi-graph $G_S(\bar{f},\tau)$ is defined as the minimum number of colors needed to $\psi$-color the edges of the multi-graph.

In the case where $\Omega(v)=1$ for all $v \in V$, the $\psi$-chromatic index is a regular chromatic index, and its value is represented by the variable L.

Theorem 3: Assuming $G_S(V,E)$ represents a multi-graph with maximum degree $\Delta$, the chromatic index L of this multi-graph satisfies the following Inequality (15):

$$\Delta \leq L \leq 3/2\Delta. \quad (15)$$

Lemma 4: Any proper $\psi$-coloring of the scheduling multi-graph $G_S(\bar{f},\tau)$ corresponds to a valid schedule for the network graph G representing a half-duplex system. A flow $\bar{f}$ is achievable if and only if the slot rate is at least $L_\psi$ slots per second, i.e., if and only if $L_\psi \tau \leq 1$.

Corollary 5: If $L_\psi$ represents the $\psi$-chromatic index of a scheduling multi-graph $G_S(\bar{f}, \tau)$, given that a slot rate of $L_\psi$ slots/second is needed to achieve the flow $\bar{f}$, then, with the available slot rate of $1/\tau$ slots per second, $$\frac{f(e)}{L_\psi \tau}, \forall e \in E$$

is an achievable flow in a half-duplex network G.

Theorem 6: If $L_\psi$ represents the $\psi$-chromatic index of a scheduling multi-graph $G_S(\bar{f},\tau)$ representing a half-duplex network G, with L representing the chromatic index of $G_S(\bar{f},\tau)$, then $$L_\psi \leq L \leq \frac{3}{2}\Delta.$$

Determining the chromatic index L of graph is NP-hard. However, there are fast algorithms to determine a 1.1-approximation to the chromatic index, e.g., as described in Nishizeki, T., and Kashiwagi, K., "On the 1.1 Edge-Coloring of Multi-graphs," SIAM *Journal of Discrete Math.*, 3(3), pp. 391-400, 1990, incorporated herein in its entirety by reference. Also, a simple greedy algorithm exists for a 2-approximate solution to the problem in time $O(m/\tau)$, as will be described below. (A greedy algorithm is one that follows the problem solving meta-heuristic of making the locally optimum choice at each stage in an attempt to find the global optimum. The greedy edge-coloring algorithm is relatively easy to implement in a distributed manner. Although the algorithm guarantees only a 2-approximation in the worst case, it usually performs much better in practice.) Moreover, an algorithm to construct the $3/2 \Delta$ solution can be computed in time $O(nm/\tau)$.

The sufficient conditions for the achievability of a link-flow vector $\bar{f}$ in a half-duplex network will now be stated.

Theorem 7: For a half-duplex network represented by the network graph G, an m-link flow vector is achievable if $$\sum_{e \in N(v)} \frac{f(e)}{c(e)} \leq \frac{2}{3}, \forall v \in V.$$

Therefore, a link-flow vector that satisfies the sufficient conditions is schedulable. It is noted that there is a gap between the necessary and sufficient conditions.

Clearly, if there exists a $v \in V$ such that $$\sum_{e \in N_{out}(v)} \frac{f(e)}{c(e)} + \frac{1}{\Omega(v)} \sum_{e \in N_{in}(v)} \frac{f(e)}{c(e)} \geq 1,$$

then the link-flow vector is not schedulable. If a link-flow vector satisfies $$\sum_{e \in N(v)} \frac{f(e)}{c(e)} \leq \frac{2}{3}, \forall v \in V,$$

then the link-flow vector is schedulable. If $\bar{f}$ does not satisfy both the necessary and the sufficient conditions, then it is not clear whether the link-flow vector is schedulable or not. This indefiniteness gap may be closed, in practice, by using the following strategy: As long as the link-flow vector $\bar{f}$ satisfies the necessary conditions, the scheduling multi-graph should be constructed, and its chromatic index determined. In this scenario, the variable τ denotes the length of the time slot, and $L'_\psi$ denotes the approximation to the ψ-chromatic index of the resulting scheduling multi-graph. If $L'_\psi \tau \leq 1$, then the given link-flow vector $\bar{f}$ is achievable. If $\bar{f}$ satisfies the sufficient conditions, then $\bar{f}$ clearly satisfies $L'_\psi \tau \leq 1$ and is therefore achievable. Using this strategy will result in determining the achievability of link-flow vectors that fall in the gap between the necessary and the sufficient conditions. This strategy may be stated formally by the following Algorithm I.

Algorithm I:

1. A determination is made whether the vector $\bar{f}$ not satisfy the necessary conditions; in which case, output f is not achievable.

2. The values τ and w(e) are determined, as given in Equation (11).

3. The scheduling graph is constructed, and an approximation $L'_\psi \tau$ to its ψ-chromatic index is determined.

4. A determination is made whether $L'_\psi \leq 1$; in which case, output f is achievable.

Algorithm I has been shown to perform extremely well in practice, and the effectiveness of this approach will be illustrated below in the case of determining the maximum achievable rate between a given pair of nodes. It is noted that the link rates corresponding to this algorithm may be achievable not only over the long run, but may also be achievable in 1 second or less.

The sufficient conditions for the achievability of a link-flow vector $\bar{f}$ in a full-duplex network will now be stated.

Graph-coloring characterization for full-duplex systems may be obtained in a substantially similar manner as for half-duplex systems.

A proper φ-coloring of the scheduling multi-graph is defined such that the following two conditions apply for all nodes v ∈ V:

1. No two edges in the outgoing edge set $N_{out}(v)$ have the same color; and

2. Any color i is present on at most Ω(v) incoming edges in $N_{in}(v)$.

The φ-chromatic index $L_\phi$ (applicable to full-duplex networks) of the scheduling multi-graph $G_S(\bar{f},\tau)$ is defined as the minimum number of colors needed in any proper φ-coloring of the scheduling multi-graph. It should be noted that there is no requirement that the colors of the incoming and outgoing links be tied together at any node, as is the case in a half-duplex system (wherein no color that appears on an edge in $N_{in}(v)$ appears on any edge in $N_{out}(v)$). Accordingly, ψ-coloring is more restrictive than φ-coloring.

Lemma 8: Any proper φ-coloring of the scheduling multi-graph $G_S(\bar{f},\tau)$ corresponds to a valid schedule for the network graph G representing a full-duplex system. A flow $\bar{f}$ is achievable if and only if the slot rate is at least $L_\phi$ slots per second, i.e., if and only if $L_\phi \tau \leq 1$.

Corollary 9: If $L_\phi$ represents the φ-chromatic index of a scheduling multi-graph $G_S(\bar{f},\tau)$, given that a slot rate of $L_\phi$ slots/second is needed to achieve the flow $\bar{f}$, then, with the available slot rate of 1/τ slots per second, $$\frac{f(e)}{L_\phi \tau}, \quad \forall e \in E$$

is an achievable flow in a full-duplex network G.

The φ-chromatic index of a scheduling multi-graph can be determined using the following Lemma 10:

Lemma 10: The φ-chromatic index $L_\phi$ of a scheduling multi-graph $G_S(\bar{f},\tau)$ is given by $$L_\phi = \max(\Delta^+, \Delta_I^-).$$

Accordingly, the sufficient conditions for the achievability of a link-flow vector in a full-duplex network, as given in the following Theorem 11, are the same as the necessary conditions for Lemma 2 in the half-duplex case:

Theorem 11: A given link-flow vector $\bar{f}$ is schedulable if and only if $$\sum_{e \in N_{out}(v)} \frac{f(e)}{c(e)} \leq 1, \quad \forall v \in V,$$

and $$\frac{1}{\Omega(v)} \sum_{e \in N_{in}(v)} \frac{f(e)}{c(e)} \leq 1, \quad \forall v \in V.$$

There exists an optimal polynomial-time algorithm for edge-coloring the scheduling multi-graph for a full-duplex system, as provided in Hakimi, S. L., and Kariv, O., "A Generalization of Edge-Coloring in Graphs," *Journal of Graph Theory*, 10, pp. 139-154, 1986, incorporated herein in its entirety by reference. However, an alternative, unified greedy algorithm that can be used for both the half-duplex and the full-duplex systems will now be described. While finding the optimum coloring requires a centralized coordinator to compute the schedules, such greedy edge-coloring can be used to obtain a 2-approximate solution to the optimal and can be implemented in a distributed manner in a wireless multi-hop network. In addition, greedy coloring can be performed in O(m) time, while the optimum coloring algorithm takes much longer. The greedy coloring algorithm for obtaining the schedules, which has been used in simulations of the present invention, as described below, receives as input the scheduling multi-graph $G_S(\bar{f},\tau)$ representing either a full-duplex or a half-duplex network and provides as output a valid edge coloring satisfying the communication constraints (full-duplex or half-duplex) imposed by the system represented by $G_S(\bar{f},\tau)$. This greedy coloring algorithm may be stated formally as the following Algorithm II.

Algorithm II:

1. A link e in the scheduling multi-graph is selected, and its endpoints are identified as u and v.

2. The smallest color i that can be assigned to e, such that the communication constraints are not violated at u or v, is selected, and the color i is assigned to e.

3. Steps (1) and (2) are repeated until all edges of $G_S(\bar{f},\tau)$ are colored.

Lemma 12: Algorithm II is 2-optimal.

For half-duplex systems, Algorithm II appears to have the best known performance bound (about 50%). For a half-duplex network with Ω(v)=1, ∀v ∈V, Algorithm I has been shown to achieve at least 67% of the optimal solution.

Achievable Rates for Multiple Source-Destination Pairs

The problem of characterizing achievable rates in the case of multiple source-destination pairs will now be discussed. It is assumed that the traffic demand for different source-destination pairs is given in the form of a rate vector $\bar{r}$ that has K<n(n−1) components. Each source-destination pair between which there is a request will be referred to as a commodity, and the variable k will be used to index the commodities. Accordingly, s(k) represents the source node for commodity k, d(k) represents the destination node for commodity k, and r(k) represents the flow that has to be routed from s(k) to d(k). The problem to be solved has as its input a directed graph G=(V,E) with a link speed c(e) for e ∈ E and K node pairs (s(k), d(k)) and a desired rate r(k) associated with each node pair. The problem to be solved provides as its output either (i) a set of routes and an associated schedule that achieves the desired rate, or (ii) a declaration that the problem is not achievable.

The strategy that can be used to determine the set of feasible routes and the associated schedules for the above problem is as follows:

1. Necessary and sufficient conditions for a rate to be achievable are formulated as described above;
2. An upper bound on the achievable rates is determined by solving a linear optimization problem over the necessary conditions; and
3. The scheduling multi-graph is used to obtain an achievable solution, which is a lower bound on the feasible rate vector.

This lower bound achieves approximately 50% of the optimal solution in the worst case and, in practice, typically achieves between 80-90% of the optimal solution.

The linear optimization problem that is solved in step (2) is used to determine bounds on the achievable rate vector. A straightforward formulation for this problem with flow variables will first be described.

To simplify notation, the following quantities are defined: $f_k(e)$ is the flow rate on link e associated with commodity k, and intermediate values $J_{out}(v)$ and $J_{in}(v)$ are defined as follows:

$$J_{out}(v) = \sum_{e \in N_{out}(v)} \frac{\sum_k f_k(e)}{c(e)},$$

and $$J_{in}(v) = \frac{1}{\Omega(v)} \sum_{e \in N_{in}(v)} \frac{\sum_k f_k(e)}{c(e)}.$$

For a half-duplex network, the following Theorem 13 may be used:

Theorem 13: Given a graph G=(V,E) with link speed c(e) associated with link e ∈ E, and K source-destination pairs (s(k), d(k)) for k=1, 2, . . . , K with a desired flow rate r(k) between s(k) and d(k), the rate vector $\bar{r}$ is achievable only if there exists a flow $f_k(e)$ such that $$\sum_{e: t(e)=s(k)} f(e) = r(k), \forall k,$$

$$\sum_{e \in N_{in}(v)} f_k(e) = \sum_{e \in N_{out}(v)} f_k(e), \forall v \neq s, d, \forall k,$$

$$J_{in}(v) + J_{out}(v) \leq 1, \forall v \in V,$$

and $$f_k(e) \geq 0, \forall e \forall k.$$

As an alternative to the foregoing flow-variable formulation, an arc-path formulation that is amenable to the development of primal-dual algorithms for the solution of FPTAS schemes will now be described. Using an FPTAS scheme may be preferable to solving the linear program directly because an FPTAS scheme is relatively simple to implement, and the speed of solution makes up for a possible slight reduction in accuracy. Based on experiments by the inventors, it has been observed that solving the linear programming problem approximately is sufficient to solve the routing-scheduling problem nearly optimally. Moreover, there is no need for a linear programming solver to solve the problem, which may be important if the algorithm is implemented at the individual nodes. In the arc-path formulation, $\mathcal{P}_k$ represents the set of paths P for the source-destination pair k, such that a given path P ∈ $\mathcal{P}_k$. The variable x(P) represents the amount of flow sent on path P. Path P leads from s(k) to d(k). From the demand requirements, it is noted that $$\sum_{P \in \mathcal{P}_k} x(P) = r(k), \forall k.$$

∀k. The total amount of flow on link e, represented f(e), is given by $$f(e) = \sum_k \sum_{P \in \mathcal{P}_k : e \in P} x(P).$$

Intermediate values $Q_{out}(v,x)$ and $Q_{in}(v,x)$ are defined as follows:

$$Q_{out}(v, x) = \sum_{e \in N_{out}(v)} \frac{\sum_k \sum_{P \in \mathcal{P}_k : e \in P} x(P)}{c(e)}, \text{ and}$$

$$Q_{in}(v, x) = \sum_{e \in N_{in}(v)} \frac{\sum_k \sum_{P \in \mathcal{P}_k : e \in P} x(P)}{\Omega(v)c(e)}.$$

Then, the necessary conditions for a rate vector $\bar{r}$ to be achievable are defined by the existence of path flows x(P) such that $$\sum_{P \in \mathcal{P}_k} x(P) = r(k), \forall k,$$

$$Q_{out}(v, x) + Q_{in}(v, x) \leq 1, \forall v \in V, \text{ and}$$

$$x(P) \geq 0, \forall P \in \mathcal{P}_k, \forall k.$$

Given a rate vector $\bar{r}$, the strategy is to solve for the x variables that satisfy the necessary conditions. If such a vector does not exist, then the given rate vector $\bar{r}$ is not achievable. If the given rate vector $\bar{r}$ satisfies the necessary conditions, then (1) a determination is made of the length of the time slot τ; (2) the schedule multi-graph is formed; and (3) the ψ-chromatic index $L_\psi$ of the schedule multi-graph is determined. Using the same techniques described above, it can be shown that $$\frac{r(k)}{L_\psi \tau}$$

is achievable. In practice, experiments by the inventors have shown that this algorithm performs extremely well.

In order to solve the linear programming problem, the achievability problem is first written as a concurrent flow problem, and then a primal-dual algorithm is used to solve the concurrent flow problem.

The primal and dual problems and solutions may be characterized as follows:

1. If the primal problem has a variables and b resource constraints, then the dual problem will have b variables and a resource constraints, where the constraint matrix of the dual problem is the transpose of the constraint matrix of the primal problem.

2. There is a one-to-one correspondence between the primal constraints and the dual variables, i.e., a variable in the dual problem is paired with an inequality in the primal problem, and similarly for the primal variables and the dual constraints.

3. The objective function of the dual problem is determined by the right-hand side of the primal constraints, and similarly for the objective function of the primal problem and the right-hand side of the dual constraints.

The problem of determining the achievability of rate vector $\bar{r}$ can be formulated as the following exemplary linear programming formulation:

maximize $\lambda$, subject to $$Q_{out}(v, x) + Q_{in}(v, x) \leq 1, \quad \forall\, v \in V,$$

$$\sum_{P \in \mathcal{P}_k} x(P) = \lambda r(k), \quad \forall\, k = 1, 2, \ldots, K,$$

$$x(P) \geq 0, \quad \forall\, P \in \mathcal{P}_k, \quad \forall\, k.$$

In the concurrent flow problem, the objective is to determine the maximum scaling factor $\lambda^*$, such that, if all the desired traffic rates are scaled up by this factor, then the network can sufficiently contain the traffic. Therefore, if the objective function $\lambda^*$ is less than one, then the vector is not achievable. If $\lambda^*$ is greater than or equal to 1, then the flow will be scheduled to determine whether the flow is achievable.

The largest flow vector that still satisfies the necessary constraints is $\lambda^* \bar{r}$, which is given by the optimal link flow vector $\bar{x}$, obtained from the solution to the linear programming formulation set forth above. If the system is a full-duplex system, then Theorem 11 indicates that the flow $\lambda^* \bar{r}$ is schedulable, and a schedule can be determined using Algorithm II, as described above. For a half-duplex system, Corollary 5 can be applied to flow $\lambda^* \bar{r}$ to obtain a schedule for a flow vector $\lambda^* \bar{r}/L^*_\psi \tau$, where $L^*_\psi$ is the $\psi$-chromatic index of the scheduling multi-graph $G_S(\bar{x}^*, \tau)$. In order for this schedulable flow to be at least $\bar{r}$, then $\lambda^*$ must be greater than or equal to $L^*_\psi \tau$, as summarized in the following Theorem 14.

Theorem 14: If $\lambda^* < 1$, then $\bar{r}$ is not schedulable. For a full-duplex system, if $\lambda^* \geq 1$, then the flow $\lambda^* \bar{r}$ is schedulable. For a half-duplex system, if $\lambda^* \geq L^*_\psi \tau$, then there exists a schedule for the flow $\lambda^* \bar{r}/L^*_\psi \tau$, and hence, for $\bar{r}$. If $1 \leq \lambda^* \leq \lambda^* \bar{r}/L^*_\psi \tau$, then it is not known whether there exists a valid schedule for $\bar{r}$.

The dual formulation of this problem assigns a weight $\eta(v)$ to each node v in the network, and a variable $z(k)$ for each commodity (source-destination pair) $k=1, 2, \ldots, K$, as follows:

$$\text{minimize} \sum_{v \in V} \eta(v)$$

subject to $$\sum_{e \in P} \frac{1}{c(e)} \left[ \eta(t(e)) + \frac{\eta(r(e))}{\Omega(r(e))} \right] \geq z(k), \quad \forall\, P \in \mathcal{P}_k, \quad \forall\, k,$$

$$\sum_{k=1}^{K} r(k) z(k) \geq 1,$$

$$\eta(v) \geq 0, \quad \forall\, e \in E.$$

FIG. 3 shows pseudo-code for an exemplary primal-dual algorithm DETERMINE_FEASIBILITY that may be employed in a half-duplex network to determine whether routing $\bar{r}$ is feasible. The primal-dual algorithm to solve the concurrent flow problem starts by assigning a precomputed weight of $\delta$ to all nodes v. The algorithm proceeds in phases. In each phase, for each commodity k, r(k) units of flow are routed from s(k) to d(k). A phase ends when commodity K is routed. The r(k) units of flow from s(k) to d(k) for commodity k are sent via multiple iterations. In each iteration, the shortest path P* from s(k) to d(k) is determined. The variable f(P*) represents the maximum flow that can be sent on this path, i.e., a flow of at most f(P*) units can be sent for each iteration. Since r(k) units of flow have to be sent for commodity k in each phase, the actual amount of flow sent is the lesser of f(P*) and the remaining amount of flow to make up r(k) in this phase. Once the flow is sent, the weights of the nodes that carry the flow are increased. Therefore, the algorithm then alternates between sending flow along shortest path pairs and adjusting the length of the links along which flow has been sent, until the optimal solution is reached.

By organizing the computation by source, flows can be sent to multiple destinations at the same time, and the running time of the algorithm has only a logarithmic dependency on the number of source-destination pairs.

Theorem 15: The DETERMINE_FEASIBILITY algorithm of FIG. 3 computes a $(1-\epsilon)^{-3}$-optimal solution to the rate achievability problem in time $O(\epsilon^{-2} m^2)$.

In the case of a full-duplex network, the following Theorem 16, which parallels Theorem 13 for the half-duplex case, forms the basis for the multiple source-destination feasibility problem.

Theorem 16: Given a graph $G=(V,E)$, with link speed $c(e)$ associated with link $e \in E$, K source-destination pairs (s(k), d(k)) for $k=1, 2, \ldots, K$ with a desired flow rate r(k) between s(k) and d(k), the rate vector $\bar{r}$ is achievable only if there exists $f_k(e)$ such that $$\sum_{e: t(e) = s(k)} f_k(e) = r(k), \forall\, k,$$

$$\sum_{e \in N_{in}(v)} f_k(e) = \sum_{e \in N_{out}(v)} f_k(e), \forall\, v \neq s, d, \forall\, k,$$

$$J_{out}(v) \leq 1, \forall\, v \in V,$$

$$J_{in}(v) \leq 1, \forall\, v \in V,$$

and $$f_k(e) \geq 0, \forall\, e \in E, \forall\, k.$$

The arc-path formulation and the resulting algorithm for the full-duplex case follow the same pattern as in the half-duplex case.

The present invention may also be employed in a hybrid network consisting of both of half-duplex and full-duplex nodes. In this scenario, V' represents the set of all half-duplex nodes, and V" represents the set of full-duplex nodes, such that V=V'∪V". The following Theorem 17 applies.

Theorem 17: Given a graph G=(V,E) with link speed c(e) associated with link e ∈ E, and K source-destination pairs (s(k), d(k)) for k−1, 2, ... , K with a desired flow rate r(k) between s(k) and d(k), the rate vector $\bar{r}$ is achievable only if there exists a flow $f_k(e)$ such that $$\sum_{e:t(e)=s(k)} f(e) = r(k), \forall k,$$

$$\sum_{e \in N_{in}(v)} f_k(e) = \sum_{e \in N_{out}(v)} f_k(e), \forall v \neq s, d, \forall k,$$

$$J_{in}(v) + J_{out}(v) \leq 1 \forall v \in V',$$

$$J_{in}(v) \leq 1, \forall v \in V'',$$

$$J_{out}(v) \leq 1, \forall v \in V'',$$

and $$f_k(e) \geq 0, \forall e \, \forall k.$$

Simulation Results

Simulations were performed using the routing-scheduling algorithms set forth above for full-duplex and half-duplex systems. The routing problem was solved using the primal-dual scheme with ε in the range of 0.05 to 0.1. The algorithm executed within about two seconds for all the problems considered. To find the schedules, the 2-approximate Algorithm II was used to solve the coloring problem. In all the examples discussed below, each source node had a demand of 1. The results of the simulation give the maximum scaling factor λ* by which a flow can be scaled so that it still meets the constraints of the linear program. It is noted that all flows were scaled uniformly by this factor. Thus, even though a single flow might have been able to send more along its paths, only the minimum common flow that every source can send is relevant to the present invention. Each example shows the upper bound λ* obtained by solving the linear programming problem with the necessary conditions, as well as the achievable solution given by the coloring algorithm. In each of FIGS. 4-6 and 9-11, the upper bound is shown by a (+) for the full duplex case, and by an (x) in the half-duplex case. The achieved lower bounds (through coloring) are shown as a histogram with the full duplex results on the left side and the half duplex results on the right side for a given set of flows. In all cases, each time slot was assumed to be 0.01 time units.

Figure 4:
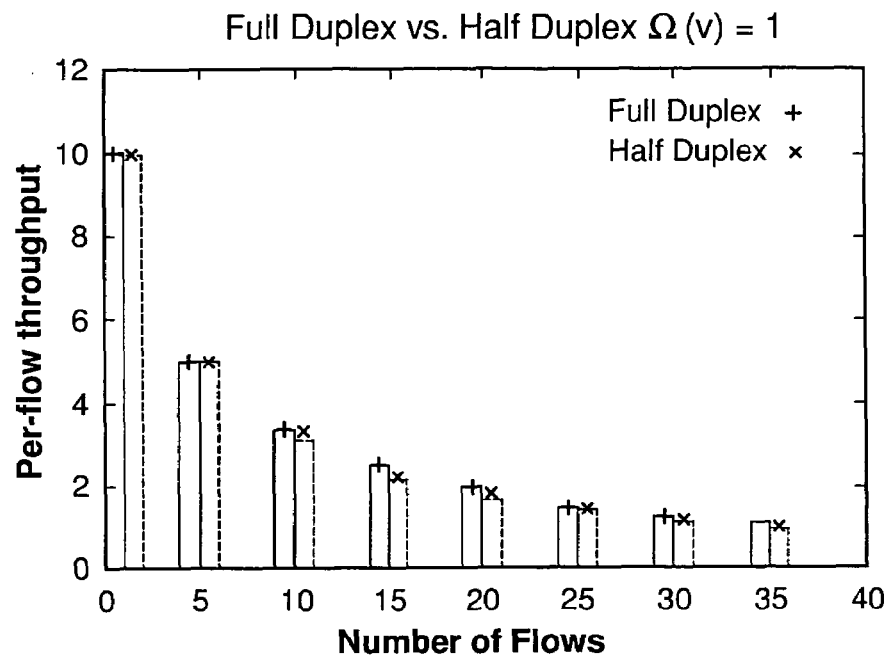
FIG. 4 shows a graph comparing per-flow throughput for 1-receiver full-duplex and half-duplex systems in a simulation of an algorithm consistent with the present invention.
Figure 5:
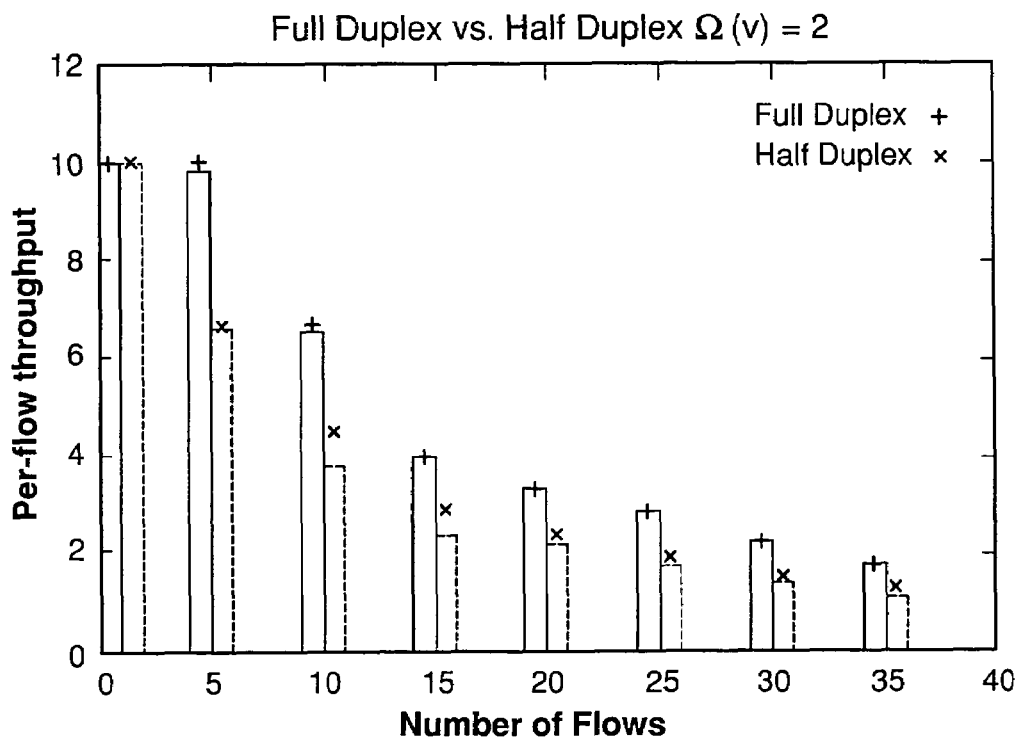
FIG. 5 shows a graph comparing per-flow throughput for 2-receiver full-duplex and half-duplex systems in a simulation of an algorithm consistent with the present invention.
Figures 6, 7A, 7B:
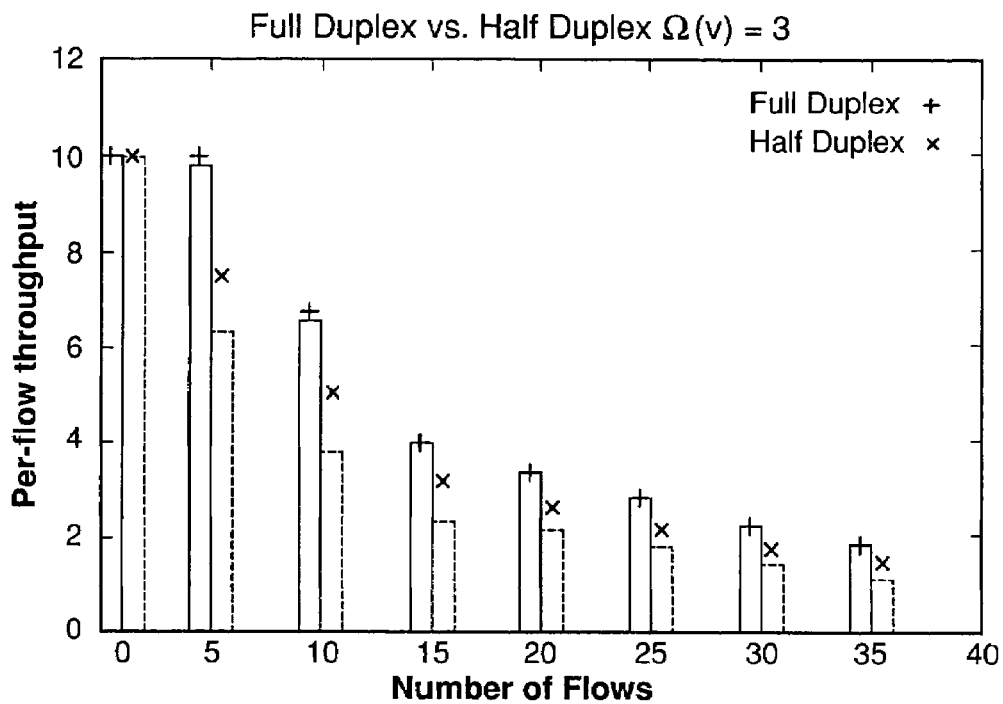
FIG. 6 shows a graph comparing per-flow throughput for 3-receiver full-duplex and half-duplex systems in a simulation of an algorithm consistent with the present invention.

In the first example, a 7×7 grid with 49 nodes and 84 bi-directional links was considered. The destinations were randomly chosen from one of the four corners of the grid, and the sources were picked at random from the rest of the grid. A node had at most 4 neighbors in a grid, while the destinations had only 2 neighbors each. Therefore, the per-flow throughput for Ω(v)=1, 2, 3 was investigated in order to compare the full-duplex and half-duplex systems. The head-to-head comparison is shown in FIGS. 4, 5, and 6, for the cases Ω(v)=1, 2, and 3, respectively. The x-axis indicates the number of flows in the simulation, and the y-axis indicates the per-flow throughput, in terms of the scaling factor λ*.

In each graph, the per-flow throughput is shown for the cases in which the number of flows was 1, 5, 10, 15, 20, 25, 30, and 35. The vertical rectangular bars in the graphs correspond to the achieved flows from the greedy coloring of Algorithm II, while the (+) and (x) annotations above the bars represent the linear programming bounds. A first observation made was that Algorithm II performed very close to optimal for the full-duplex system, achieving about 95% and above performance in all cases. In fact, the number of colors used by Algorithm II was only one more than the optimal. For the half-duplex case, Algorithm II performed within 70% of the upper bound in all cases.

When there was only one receiver unit (Ω(v)=1), there was not much of a difference in performance between the half-duplex and the full-duplex cases, for a small number of flows. This is because there existed at least two independent paths from the source to the destination, and in such a scenario, the half-duplex throughput was equal to the single-path full-duplex throughput. It is noted that, with 35 flows, the network was very loaded, such that the per-flow throughput dropped below 1 for the half-duplex case with Ω(v)=1.

For Ω(v)=2 and 3, the difference between the half-duplex and full-duplex systems became very pronounced. As before, when the number of flows was very small, there was no difference, but when the network became loaded, the intermediate nodes in the grid could handle more load with the additional resources, represented by Ω(v), thereby making use of the full-duplex system to achieve higher per-flow throughput.

The performance of each individual system was examined as the number of receivers Ω(v) was increased. The results were tabulated and are shown in Tables 1 and 2 of FIG. 7. For each Ω(v)=1, 2, 3, the upper bound from the linear program (UB) is listed, and the schedulable flow obtained from the greedy Algorithm II (SF) shown as a percentage of the upper bound. It can be seen from the tables that per-flow throughput increased as Ω increased. The gain improved as the load (number of flows) increased. In addition, the improvement was more when migrating from Ω(v)=1 to Ω(v)=2 than when migrating from Ω(v)=2 to Ω(v)=3. This can be interpreted as the dependency of Ω(v) on the number of neighbors that use a particular node to relay information. The more neighbors for which a node relays information, the more performance gain achieved by using a larger Ω(v). However, since a node can transmit to only one other node at a time, there is no advantage gained from receiving from many neighbors at once, since the transmit link will become a bottleneck.

Figure 8:
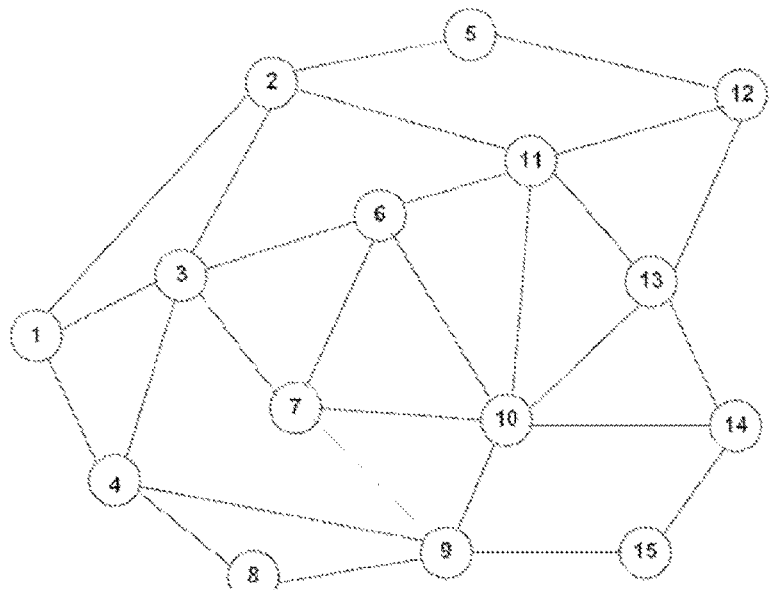
FIG. 8 shows an exemplary 15-node mesh network employed for simulations of exemplary embodiments of the present invention.

While many random topologies with varying numbers of nodes were tested, one such example will now be described, the results of which are representative of results with random graphs in general. As illustrated in FIG. 8, the exemplary network chosen for the simulation was a 15-node network with 28 bi-directional links.

In this example, the 15 nodes were randomly distributed in a 1000 meter×1000 meter square. All nodes within a distance of 200 meters from a given node were assumed to have direct communication with that node. The link speed was normalized to 1 unit. As before, each node could send to every other node in the network at the unit rate. There were a total of 28 links in the graph, as shown in FIG. 8.

Figure 9:
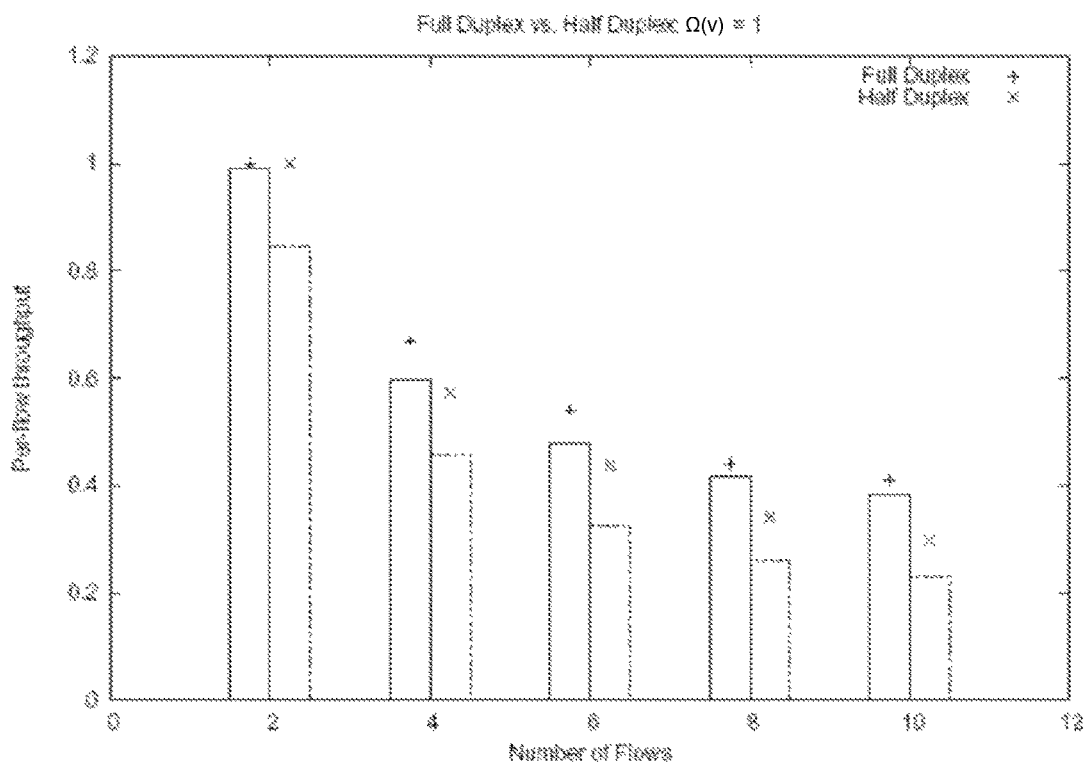
FIG. 9 shows a graph of simulation results comparing achievable per-flow throughput for 1-receiver full-duplex and half-duplex systems in the exemplary network of FIG. 8.
Figure 10:
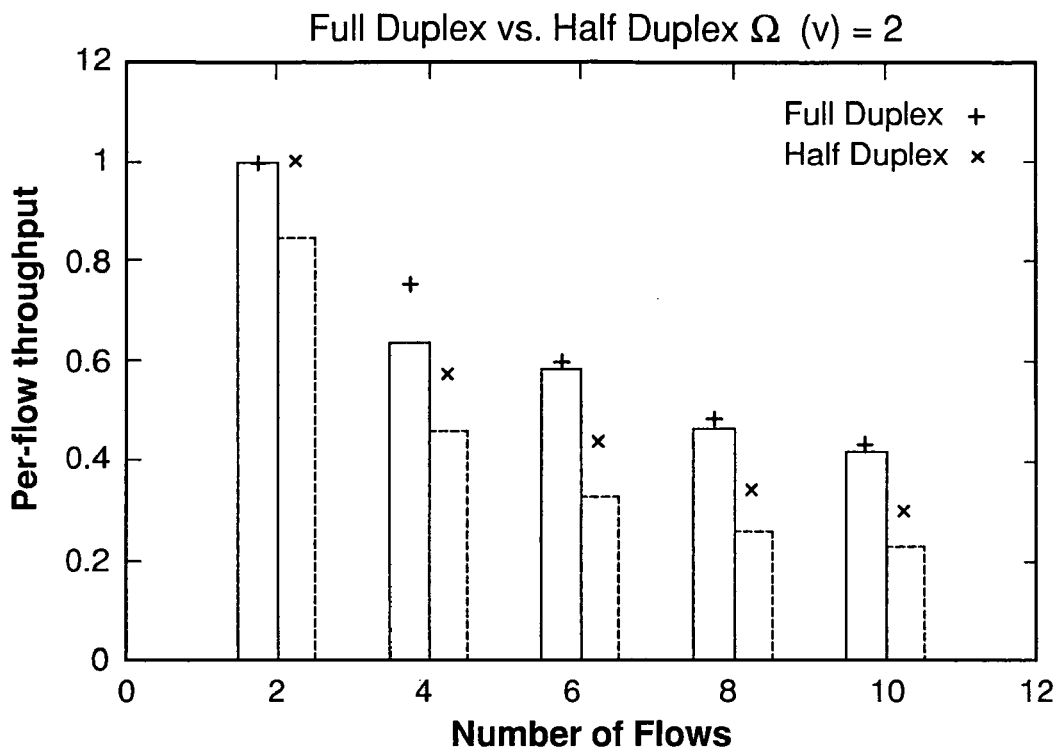
FIG. 10 shows a graph of simulation results comparing achievable per-flow throughput for 2-receiver full-duplex and half-duplex systems in the exemplary network of FIG. 8.
Figure 11:
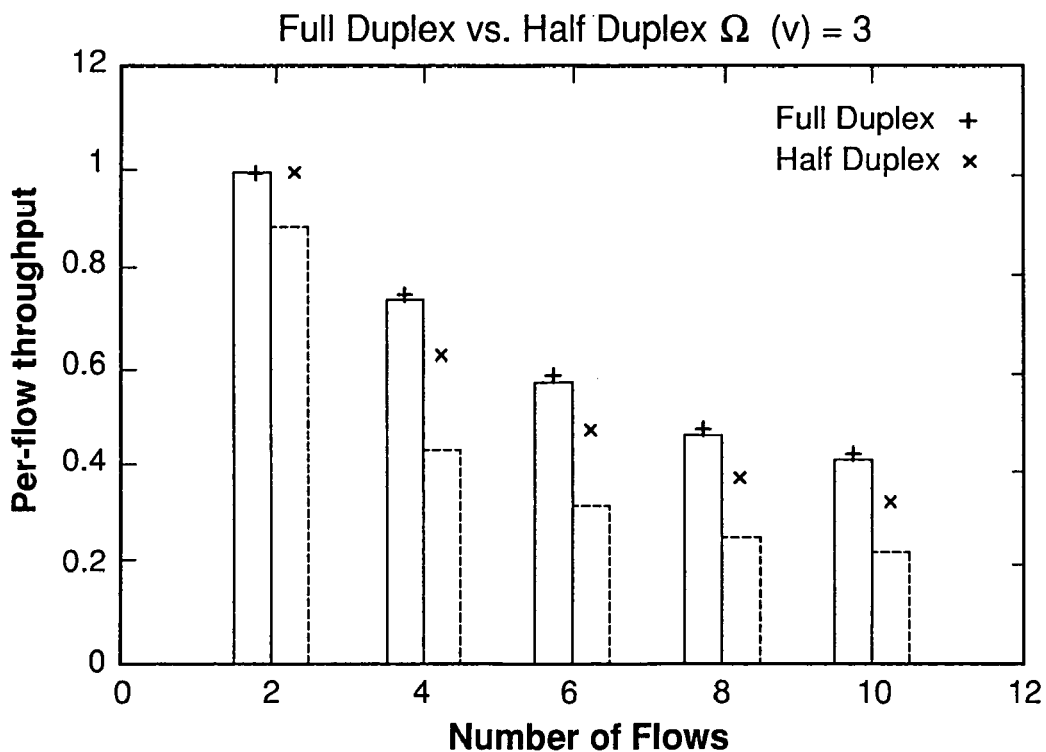
FIG. 11 shows a graph of simulation results comparing achievable per-flow throughput for 3-receiver full-duplex and half-duplex systems in the exemplary network of FIG. 8.

The number of flows was varied from 2 to 10 in steps of 2, and the resulting achievable per-flow throughput is plotted in FIGS. 9, 10, and 11, for Ω(v)=1, 2, 3, respectively. The x-axis represents the number of flows, while the y-axis represents per-flow throughput. For Ω(v)=1, the difference between half-duplex and full-duplex systems was more pronounced in this scenario because, for most sources, almost all of the flow was routed on a single path, whereby simultaneous transmission and reception yielded significant benefits. For $\Omega(v)=2$, the greedy coloring Algorithm II on the full-duplex system performed slightly worse, with the results at least 92% of the optimal. Algorithm II performed near optimally for $\Omega(v)=3$, however. For the half-duplex system, the coloring always was within 70% of the upper bound.

These simulations confirm that a full-duplex system easily outperforms the half-duplex system, even for $\Omega(v)=1$. In addition, there are clear throughput gains when the capability exists for receiving from more than one neighbor, even for a half-duplex system.

A method consistent with one embodiment of the present invention may provide one or more of the advantages of more efficient utilization of network capacity, reduced congestion at network nodes, and higher packet throughput of the network. The method may be implemented for a requested path by either a centralized network management system (e.g., apparatus 100 located at node 101 shown in FIG. 1) or by each node of the network, or both. An implementation employing a centralized network management system that distributes results to network nodes may be preferred for coordination of provisioning of new paths. A distributed implementation in each node of the network may be preferred when no centralized network management system exists and/or if the requested path is a distributed request implemented with control packets routed through a network.

It should be recognized that, while the networks described in the above embodiments are wireless multi-hop mesh networks, the present invention could be used with other types of wireless networks, wired networks, optically-connected networks, or hybrid networks that include combinations of wired, wireless, and/or optically-connected elements.

The various functions of a method consistent with one embodiment of the present invention may be implemented with circuit elements or may also be implemented in the digital domain as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of routing data from a source node to a destination node in a multi-hop network of nodes interconnected by links, comprising:
   (a) determining that a link-flow vector satisfies one or more necessary scheduling conditions for achievability, wherein the link-flow vector represents a set of flows to be routed on one or more links from the source node to the destination node;
   (b) generating a scheduling multi-graph for the network, wherein the scheduling multi-graph comprises a graph having at least one pair of nodes with multiple edges therebetween;
   (c) deriving one or more sufficient scheduling conditions for achievability of the link-flow vector;
   (d) solving a linear optimization problem over the one or more necessary scheduling conditions to obtain an upper bound on the achievability of the link-flow vector;
   (e) generating, based on the scheduling multi-graph, a solution comprising a set of routes and an associated schedule for achieving the link-flow vector, the solution being a lower bound on the achievability of the link-flow vector; and
   (f) implementing a routing method using the set of routes and the associated schedule to route the link-flow vector from the source node to the destination node;
   wherein:
      at least one node v of the network receives transmissions from a specified plurality $\Omega(v)$ of other nodes, and at least one of the scheduling conditions depends on $\Omega(v)$;
      the linear optimization problem is solved as a concurrent flow problem;
      the linear optimization problem is solved using a primal-dual algorithm that alternates between (i) sending the data along shortest path pairs and (ii) adjusting the length of links along which the data has been sent until an optimum solution is reached;
      $N_{in}(v)$ represents a set of all incoming links at node v in the network;
      $N_{out}(v)$ represents a set of all outgoing links at node v in the network;
      $\mathcal{P}_k$ represents a set of all paths P for a source-destination pair k from s(k) to d(k);
      x(P) represents an amount of flow sent on path P;
      a rate vector $\bar{r}$ having K components represents traffic demand for a plurality of different source-destination node pairs (s(k),d(k)) for a commodity k=1, 2, ... K, with a desired flow rate r(k) between s(k) and d(k);
      c(e) represents capacity of a link e in the network;
      t(e) represents a transmitting node at one end of link e;
      r(e) represents a receiving node at the other end of link e;
      η(v) represents a weight of node v;
      z(k) is an intermediate variable assigned to each commodity k=1, 2, ... K;
      λ is a scaling factor of the network;
      V" represents a set of nodes consisting of all full-duplex nodes in the network;

V' represents a set of nodes consisting of all half-duplex nodes in the network;

$$Q_{out}(v, x) \text{ is defined as } \sum_{e \in N_{out}(v)} \frac{\sum_k \sum_{P \in \mathcal{P}_k: e \in P} x(P)}{c(e)};$$

$$Q_{in}(v, x) \text{ is defined as } \sum_{e \in N_{in}(v)} \frac{\sum_k \sum_{P \in \mathcal{P}_k: e \in P} x(P)}{\Omega(v) c(e)}; \text{ and}$$

a primal formulation is:
maximize λ,
subject to $$Q_{out}(v, x) + Q_{in}(v, x) \le 1, \forall v \in V',$$

$$Q_{out}(v, x) \le 1, \forall v \in V''$$

$$Q_{in}(v, x) \le 1, \forall v \in V''$$

$$\sum_{P \in \mathcal{P}_k} x(P) = \lambda r(k), \forall k = 1, 2, \dots, K,$$

$$x(P) \ge 0, \forall P \in \mathcal{P}_k, \forall k.$$

2. The invention of claim 1, further comprising routing the data between the source node and the destination node according to the routing method.

3. The invention of claim 1, wherein the network is a wireless network.

4. The invention of claim 1, wherein the network is a mesh network.

5. The invention of claim 1, wherein:
V' represents a set of nodes consisting of all half-duplex nodes in the network;
$N_{in}(v)$ represents a set of links consisting of all incoming links at node v in the network;
$N_{out}(v)$ represents a set of links consisting of all outgoing links at node v in the network;
f(e) represents a desired flow on a link e;
c(e) represents capacity of link e; and
one of the necessary conditions is:

$$\sum_{e \in N_{out}(v)} \frac{f(e)}{c(e)} + \frac{1}{\Omega(v)} \sum_{e \in N_{in}(v)} \frac{f(e)}{c(e)} \le 1.$$

$$\forall v \in V'.$$

6. The invention of claim 1, wherein:
V' represents a set of nodes consisting of all half-duplex nodes in the network;
$N_{in}(v)$ represents a set of links consisting of all incoming links at node v in the network;
$N_{out}(v)$ represents a set of links consisting of all outgoing links at node v in the network;
$y_e^t$ represents a link activity vector on a link e at time t; and
one of the sufficient conditions is:

$$\sum_{e \in N_{out}(v)} y_e^t + \frac{1}{\Omega(v)} \sum_{e \in N_{in}(v)} y_e^t \le 1, \forall v \in V', \forall t \le T.$$

7. The invention of claim 1, wherein:
V" represents a set of nodes consisting of all full-duplex nodes in the network;
$N_{in}(v)$ represents a set of links consisting of all incoming links at node v in the network;
$N_{out}(v)$ represents a set of links consisting of all outgoing links at node v in the network;
f(e) represents a desired flow on a link e;
c(e) represents capacity of link e; and
one of the necessary conditions is:

$$\sum_{e \in N_{out}(v)} \frac{f(e)}{c(e)} \le 1, \forall v \in V'',$$

and $$\frac{1}{\Omega(v)} \sum_{e \in N_{in}(v)} \frac{f(e)}{c(e)} \le 1, \forall v \in V''.$$

8. The invention of claim 1, wherein:
V" represents a set of nodes consisting of all full-duplex nodes in the network;
$N_{in}(v)$ represents a set of links consisting of all incoming links at node v in the network;
$N_{out}(v)$ represents a set of links consisting of all outgoing links at node v in the network;
$y_t^e$ represents a link activity vector on a link e at time t; and
one of the sufficient conditions is:

$$\sum_{e \in N_{out}(v)} y_e^t \le 1, \forall v \in V'', \forall t \le T,$$

and $$\frac{1}{\Omega(v)} \sum_{e \in N_{in}(v)} y_e^t \le 1, \forall v \in V'', \forall t \le T.$$

9. The invention of claim 1, wherein the one or more sufficient scheduling conditions for achievability of the link-flow vector are derived by edge-coloring the scheduling multi-graph.

10. A method of routing data from a source node to a destination node in a multi-hop network of nodes interconnected by links, comprising:
(a) determining that a link-flow vector satisfies one or more necessary scheduling conditions for achievability, wherein the link-flow vector represents a set of flows to be routed on one or more links from the source node to the destination node;
(b) generating a scheduling multi-graph for the network, wherein the scheduling multi-graph comprises a graph having at least one pair of nodes with multiple edges therebetween;
(c) deriving one or more sufficient scheduling conditions for achievability of the link-flow vector;
(d) solving a linear optimization problem over the one or more necessary scheduling conditions to obtain an upper bound on the achievability of the link-flow vector;

(e) generating, based on the scheduling multi-graph, a solution comprising a set of routes and an associated schedule for achieving the link-flow vector, the solution being a lower bound on the achievability of the link-flow vector; and (f) implementing a routing method using the set of routes and the associated schedule to route the link-flow vector from the source node to the destination node;

wherein at least one node v of the network transmits and receives in a same time slot, and at least one of the scheduling conditions includes (i) a first part that depends on a set of links $N_{in}(v)$ terminating at node v and (ii) a second part, evaluated separately from the first part, that depends on evaluating a set of links $N_{out}(v)$ emanating from node v.

11. The invention of claim 10, wherein at least one node v of the network receives transmissions from a specified plurality $\Omega(v)$ of other nodes, and at least one of the scheduling conditions depends on $\Omega(v)$.

12. The invention of claim 11, wherein:
V' represents a set of nodes consisting of all half-duplex nodes in the network;
f(e) represents a desired flow on a link e;
c(e) represents capacity of link e; and
one of the necessary conditions is:

$$\sum_{e \in N_{out}(v)} \frac{f(e)}{c(e)} + \frac{1}{\Omega(v)} \sum_{e \in N_{in}(v)} \frac{f(e)}{c(e)} \leq 1, \forall v \in V'.$$

13. The invention of claim 11, wherein:
V' represents a set of nodes consisting of all half-duplex nodes in the network;
$y_e^t$ represents a link activity vector on a link e at time t; and
one of the sufficient conditions is:

$$\sum_{e \in N_{out}(v)} y_e^t + \frac{1}{\Omega(v)} \sum_{e \in N_{in}(v)} y_e^t \leq 1, \forall v \in V', \forall t \leq T.$$

14. The invention of claim 11, wherein:
V" represents a set of nodes consisting of all full-duplex nodes in the network;
f(e) represents a desired flow on a link e;
c(e) represents capacity of link e; and
one of the necessary conditions is:

$$\sum_{e \in N_{out}(v)} \frac{f(e)}{c(e)} \leq 1, \forall v \in V'', \text{ and}$$

$$\frac{1}{\Omega(v)} \sum_{e \in N_{in}(v)} \frac{f(e)}{c(e)} \leq 1, \forall v \in V''.$$

15. The invention of claim 11, wherein:
V" represents a set of nodes consisting of all full-duplex nodes in the network;
$y_t^e$ represents a link activity vector on a link e at time t; and
one of the sufficient conditions is:

$$\sum_{e \in N_{out}(v)} \frac{f(e)}{c(e)} \leq 1, \forall v \in V'', \forall t \leq T, \text{ and}$$

$$\frac{1}{\Omega(v)} \sum_{e \in N_{in}(v)} y_e^t \leq 1, \forall v \in V'', \forall t \leq T.$$

16. The invention of claim 11, wherein:
the one or more sufficient scheduling conditions for achievability of the link-flow vector are derived by edge-coloring the scheduling multi-graph;
V' represents a set of nodes consisting of all half-duplex nodes in the network; and
edge-coloring the scheduling multi-graph requires that, for all nodes v ∈V',
(1) no two edges in an outgoing edge set $N_{out}(v)$ have the same color;
(2) any color i is present on at most $\Omega(v)$ incoming edges in $N_{in}(v)$; and
(3) no color that appears on an edge in $N_{in}(v)$ appears on any edge in $N_{out}(v)$.

17. The invention of claim 11, wherein:
the one or more sufficient scheduling conditions for achievability of the link-flow vector are derived by edge-coloring the scheduling multi-graph;
V" represents a set of nodes consisting of all full-duplex nodes in the network; and
edge-coloring the scheduling multi-graph requires that, for all nodes v ∈V",
(1) no two edges in an outgoing edge set $N_{out}(v)$ have the same color; and
(2) any color i is present on at most $\Omega(v)$ incoming edges in $N_{in}(v)$.

18. The invention of claim 10, wherein the linear optimization problem is solved as a concurrent flow problem.

19. The invention of claim 18, wherein the linear optimization problem is solved using a primal-dual algorithm that alternates between (i) sending the data along shortest path pairs and (ii) adjusting the length of links along which the data has been sent until an optimum solution is reached.

20. The invention of claim 10, wherein the one or more sufficient scheduling conditions for achievability of the link-flow vector are derived by edge-coloring the scheduling multi-graph.

21. The invention of claim 10, further comprising routing the data between the source node and the destination node according to the routing method.

22. The invention of claim 10, wherein the network is a wireless network.

23. The invention of claim 10, wherein the network is a mesh network.

24. The invention of claim 20, wherein the edge coloring is performed by:
(1) selecting a link in the scheduling multi-graph, the link having endpoints;
(2) assigning to the selected link the smallest color that can be assigned such that the one or more necessary scheduling conditions are satisfied at the endpoints; and
(3) repeating substeps (1) and (2) until all edges of the scheduling multi-graph are colored.

25. A multi-hop network of nodes interconnected by links, wherein the network comprises an apparatus for routing data from a source node to a destination node, the apparatus adapted to:

(a) determine that a link-flow vector satisfies one or more necessary scheduling conditions for achievability, wherein the link-flow vector represents a set of flows to be routed on one or more links from the source node to the destination node;

(b) generate a scheduling multi-graph for the network, wherein the scheduling multi-graph comprises a graph having at least one pair of nodes with multiple edges therebetween;

(c) derive one or more sufficient scheduling conditions for achievability of the link-flow vector;

(d) solve a linear optimization problem over the one or more necessary scheduling conditions to obtain an upper bound on the achievability of the link-flow vector;

(e) generate, based on the scheduling multi-graph, a solution comprising a set of routes and an associated schedule for achieving the link-flow vector, the solution being a lower bound on the achievability of the link-flow vector; and (f) implement a routing method using the set of routes and the associated schedule to route the link-flow vector from the source node to the destination node;

wherein at least one node v of the network transmits and receives in a same time slot, and at least one of the scheduling conditions includes (i) a first part that depends on a set of links $N_{in}(v)$ terminating at node v and (ii) a second part, evaluated separately from the first part, that depends on evaluating a set of links $N_{out}(v)$ emanating from node v.

26. The network of claim 25, wherein the apparatus is a centralized controller adapted to communicate with the nodes to control routing through the network.

27. The network of claim 25, wherein each node comprises an instance of the apparatus such that control of routing is distributed within the network.

28. The invention of claim 25, wherein the network is a wireless network.

29. The invention of claim 25, wherein the network is a mesh network.

30. The invention of claim 25, wherein the one or more sufficient scheduling conditions for achievability of the link-flow vector are derived by edge-coloring the scheduling multi-graph.

31. Apparatus for routing data from a source node to a destination node in a multi-hop network of nodes interconnected by links, the apparatus adapted to:

(a) determine that a link-flow vector satisfies one or more necessary scheduling conditions for achievability, wherein the link-flow vector represents a set of flows to be routed on one or more links from the source node to the destination node;

(b) generate a scheduling multi-graph for the network, wherein the scheduling multi-graph comprises a graph having at least one pair of nodes with multiple edges therebetween;

(c) derive one or more sufficient scheduling conditions for achievability of the link-flow vector;

(d) solve a linear optimization problem over the one or more necessary scheduling conditions to obtain an upper bound on the achievability of the link-flow vector;

(e) generate, based on the scheduling multi-graph, a solution comprising a set of routes and an associated schedule for achieving the link-flow vector, the solution being a lower bound on the achievability of the link-flow vector; and (f) implement a routing method using the set of routes and the associated schedule to route the link-flow vector from the source node to the destination node;

wherein at least one node v of the network transmits and receives in a same time slot, and at least one of the scheduling conditions includes (i) a first part that depends on a set of links $N_{in}(v)$ terminating at node v and (ii) a second part, evaluated separately from the first part, that depends on evaluating a set of links $N_{out}(v)$ emanating from node v.

32. The invention of claim 9, wherein the edge coloring is performed by:

(1) selecting a link in the scheduling multi-graph, the link having endpoints;

(2) assigning to the selected link the smallest color that can be assigned such that the one or more necessary scheduling conditions are satisfied at the endpoints; and (3) repeating substeps (1) and (2) until all edges of the scheduling multi-graph are colored.

33. The invention of claim 9, wherein:

V' represents a set of nodes consisting of all half-duplex nodes in the network;

$N_{in}(v)$ represents a set of links consisting of all incoming links at node v in the network;

$N_{out}(v)$ represents a set of links consisting of outgoing links at node v in the network; and edge-coloring the scheduling multi-graph requires that, for all nodes $v \in V'$, (1) no two edges in the outgoing edge set $N_{out}(v)$ have the same color;

(2) any color i is present on at most $\Omega(v)$ incoming edges in $N_{in}(v)$; and (3) no color that appears on an edge in $N_{in}(v)$ appears on any edge in $N_{out}(v)$.

34. The invention of claim 9, wherein:

V" represents a set of nodes consisting of all full-duplex nodes in the network;

$N_{in}(v)$ represents a set of links consisting of all incoming links at node v in the network;

$N_{out}(v)$ represents a set of links consisting of all outgoing links at node v in the network; and edge-coloring the scheduling multi-graph requires that, for all nodes $v \in V"$, (1) no two edges in an outgoing edge set $N_{out}(v)$ have the same color; and (2) any color i is present on at most $\Omega(v)$ incoming edges in $N_{in}(v)$.

35. A method of routing data from a source node to a destination node in a multi-hop network of nodes interconnected by links, comprising:

(a) determining that a link-flow vector satisfies one or more necessary scheduling conditions for achievability, wherein the link-flow vector represents a set of flows to be routed on one or more links from the source node to the destination node;

(b) generating a scheduling multi-graph for the network, wherein the scheduling multi-graph comprises a graph having at least one pair of nodes with multiple edges therebetween;

(c) deriving one or more sufficient scheduling conditions for achievability of the link-flow vector;

(d) solving a linear optimization problem over the one or more necessary scheduling conditions to obtain an upper bound on the achievability of the link-flow vector;

(e) generating, based on the scheduling multi-graph, a solution comprising a set of routes and an associated schedule for achieving the link-flow vector, the solution being a lower bound on the achievability of the link-flow vector; and
(f) implementing a routing method using the set of routes and the associated schedule to route the link-flow vector from the source node to the destination node;

wherein:
at least one node v of the network receives transmissions from a specified plurality $\Omega(v)$ of other nodes, and at least one of the scheduling conditions depends on $\Omega(v)$;
V' represents a set of nodes consisting of all half-duplex nodes in the network;
$N_{in}(v)$ represents a set of links consisting of all incoming links at node v in the network;
$N_{out}(v)$ represents a set of links consisting of all outgoing links at node v in the network;
f(e) represents a desired flow on a link e;
c(e) represents capacity of link e; and
one of the necessary conditions is:

$$\sum_{e \in N_{out}(v)} \frac{f(e)}{c(e)} + \frac{1}{\Omega(v)} \sum_{e \in N_{in}(v)} \frac{f(e)}{c(e)} \leq 1, \forall v \in V'.$$

36. A method of routing data from a source node to a destination node in a multi-hop network of nodes interconnected by links, comprising:
(a) determining that a link-flow vector satisfies one or more necessary scheduling conditions for achievability, wherein the link-flow vector represents a set of flows to be routed on one or more links from the source node to the destination node;
(b) generating a scheduling multi-graph for the network, wherein the scheduling multi-graph comprises a graph having at least one pair of nodes with multiple edges therebetween;
(c) deriving one or more sufficient scheduling conditions for achievability of the link-flow vector;
(d) solving a linear optimization problem over the one or more necessary scheduling conditions to obtain an upper bound on the achievability of the link-flow vector;
(e) generating, based on the scheduling multi-graph, a solution comprising a set of routes and an associated schedule for achieving the link-flow vector, the solution being a lower bound on the achievability of the link-flow vector; and
(f) implementing a routing method using the set of routes and the associated schedule to route the link-flow vector from the source node to the destination node;

wherein:
at least one node v of the network receives transmissions from a specified plurality $\Omega(v)$ of other nodes, and at least one of the scheduling conditions depends on $\Omega(v)$;
V' represents a set of nodes consisting of all half-duplex nodes in the network;
$N_{in}(v)$ represents a set of links consisting of all incoming links at node v in the network;
$N_{out}(v)$ represents a set of links consisting of all outgoing links at node v in the network;

$y_t^e$ represents a link activity vector on a link e at time t; and
one of the sufficient conditions is:

$$\sum_{e \in N_{out}(v)} y_e^t + \frac{1}{\Omega(v)} \sum_{e \in N_{in}(v)} y_e^t \leq 1, \forall v \in V', \forall t \leq T.$$

37. A method of routing data from a source node to a destination node in a multi-hop network of nodes interconnected by links, comprising:
(a) determining that a link-flow vector satisfies one or more necessary scheduling conditions for achievability, wherein the link-flow vector represents a set of flows to be routed on one or more links from the source node to the destination node;
(b) generating a scheduling multi-graph for the network, wherein the scheduling multi-graph comprises a graph having at least one pair of nodes with multiple edges therebetween;
(c) deriving one or more sufficient scheduling conditions for achievability of the link-flow vector;
(d) solving a linear optimization problem over the one or more necessary scheduling conditions to obtain an upper bound on the achievability of the link-flow vector;
(e) generating, based on the scheduling multi-graph, a solution comprising a set of routes and an associated schedule for achieving the link-flow vector, the solution being a lower bound on the achievability of the link-flow vector; and
(f) implementing a routing method using the set of routes and the associated schedule to route the link-flow vector from the source node to the destination node;

wherein:
at least one node v of the network receives transmissions from a specified plurality $\Omega(v)$ of other nodes, and at least one of the scheduling conditions depends on $\Omega(v)$;
V" represents a set of nodes consisting of all full-duplex nodes in the network;
$N_{in}(v)$ represents a set of links consisting of all incoming links at node v in the network;
$N_{out}(v)$ represents a set of links consisting of all outgoing links at node v in the network;
f(e) represents a desired flow on a link e;
c(e) represents capacity of link e; and
one of the necessary conditions is:

$$\sum_{e \in N_{out}(v)} \frac{f(e)}{c(e)} \leq 1, \forall v \in V'', \text{ and}$$

$$\frac{1}{\Omega(v)} \sum_{e \in N_{in}(v)} \frac{f(e)}{c(e)} \leq 1, \forall v \in V''.$$

38. A method of routing data from a source node to a destination node in a multi-hop network of nodes interconnected by links, comprising:
(a) determining that a link-flow vector satisfies one or more necessary scheduling conditions for achievability, wherein the link-flow vector represents a set of flows to be routed on one or more links from the source node to the destination node;

(b) generating a scheduling multi-graph for the network, wherein the scheduling multi-graph comprises a graph having at least one pair of nodes with multiple edges therebetween;

(c) deriving one or more sufficient scheduling conditions for achievability of the link-flow vector;

(d) solving a linear optimization problem over the one or more necessary scheduling conditions to obtain an upper bound on the achievability of the link-flow vector;

(e) generating, based on the scheduling multi-graph, a solution comprising a set of routes and an associated schedule for achieving the link-flow vector, the solution being a lower bound on the achievability of the link-flow vector; and (f) implementing a routing method using the set of routes and the associated schedule to route the link-flow vector from the source node to the destination node;

wherein:
at least one node v of the network receives transmissions from a specified plurality $\Omega(v)$ of other nodes, and at least one of the scheduling conditions depends on $\Omega(v)$;

$V''$ represents a set of nodes consisting of all full-duplex nodes in the network;

$N_{in}(v)$ represents a set of links consisting of all incoming links at node v in the network;

$N_{out}(v)$ represents a set of links consisting of all outgoing links at node v in the network;

$y_t^e$ represents a link activity vector on a link e at time t; and one of the sufficient conditions is:

$$\sum_{e \in N_{out}(v)} \frac{f(e)}{c(e)} \leq 1, \forall v \in V'', \forall t \leq T, \text{ and}$$

$$\frac{1}{\Omega(v)} \sum_{e \in N_{in}(v)} y_e^t \leq 1, \forall v \in V'', \forall t \leq T.$$

39. A method of routing data from a source node to a destination node in a multi-hop network of nodes interconnected by links, comprising:

(a) determining that a link-flow vector satisfies one or more necessary scheduling conditions for achievability, wherein the link-flow vector represents a set of flows to be routed on one or more links from the source node to the destination node;

(b) generating a scheduling multi-graph for the network, wherein the scheduling multi-graph comprises a graph having at least one pair of nodes with multiple edges therebetween;

(c) deriving one or more sufficient scheduling conditions for achievability of the link-flow vector;

(d) solving a linear optimization problem over the one or more necessary scheduling conditions to obtain an upper bound on the achievability of the link-flow vector;

(e) generating, based on the scheduling multi-graph, a solution comprising a set of routes and an associated schedule for achieving the link-flow vector, the solution being a lower bound on the achievability of the link-flow vector; and (f) implementing a routing method using the set of routes and the associated schedule to route the link-flow vector from the source node to the destination node;

wherein:
at least one node v of the network receives transmissions from a specified plurality $\Omega(v)$ of other nodes, and at least one of the scheduling conditions depends on $\Omega(v)$;

the one or more sufficient scheduling conditions for achievability of the link-flow vector are derived by edge-coloring the scheduling multi-graph;

$V''$ represents a set of nodes consisting of all full-duplex nodes in the network;

$N_{in}(v)$ represents a set of links consisting of all incoming links at node v in the network;

$N_{out}(v)$ represents a set of links consisting of all outgoing links at node v in the network; and edge-coloring the scheduling multi-graph requires that, for all nodes $v \in V''$,
(1) no two edges in an outgoing edge set $N_{out}(v)$ have the same color; and
(2) any color i is present on at most $\Omega(v)$ incoming edges in $N_{in}(v)$.

* * * * *

UNITED STATES PATENT AND TRADEMARK OFFICE
CERTIFICATE OF CORRECTION

PATENT NO. : 7,660,315 B2
APPLICATION NO. : 11/194748
DATED : February 9, 2010
INVENTOR(S) : Muralidharan S. Kodialam and Thyagarajan Nandagopal It is certified that error appears in the above-identified patent and that said Letters Patent is hereby corrected as shown below:

In column 23, claim 5, line 51, please replace " $\sum_{e \in N_{out}(v)} \frac{f(e)}{c(e)} + \frac{1}{\Omega(v)} \sum_{e \in N_{in}(v)} \frac{f(e)}{c(e)} \leq 1. \forall v \in V'$ " with -- $\sum_{e \in N_{out}(v)} \frac{f(e)}{c(e)} + \frac{1}{\Omega(v)} \sum_{e \in N_{in}(v)} \frac{f(e)}{c(e)} \leq 1, \forall v \in V'$ . --.

Signed and Sealed this

Tenth Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,660,315 B2
APPLICATION NO. : 11/194748
DATED : February 9, 2010
INVENTOR(S) : Kodialam et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 796 days.

Signed and Sealed this

Twenty-eighth Day of December, 2010

David J. Kappos
*Director of the United States Patent and Trademark Office*